United States Patent [19]
Choi et al.

[11] Patent Number: 5,604,551
[45] Date of Patent: Feb. 18, 1997

[54] MAGNETIC RECORDING/REPRODUCING APPARATUS WITH VIDEO CAMERA, SUITED FOR PHOTORECORDING WITHOUT ATTENDING CAMERA OPERATOR

[75] Inventors: Young-gyo Choi; Bong-rae Park, both of Kyungki-do, Rep. of Korea; Allen L. Limberg, Vienna, Va.

[73] Assignee: Samsung Electronics Co., Ltd., Suwon, Rep. of Korea

[21] Appl. No.: 569,541

[22] Filed: Dec. 8, 1995

Related U.S. Application Data

[62] Division of Ser. No. 383,483, Feb. 2, 1995.

[30] Foreign Application Priority Data

Feb. 3, 1994 [KR]  Rep. of Korea .................. 94-1982
Apr. 28, 1994 [KR]  Rep. of Korea .................. 94-9086

[51] Int. Cl.⁶ ................................................. G03B 29/00
[52] U.S. Cl. ........................ 396/58; 396/427; 396/428
[58] Field of Search ............................ 354/75, 76, 81, 354/293

[56] References Cited

U.S. PATENT DOCUMENTS 4,581,758  4/1986  Coker et al. ........................ 381/56
5,012,335  4/1991  Cohodar ............................. 354/81
5,066,970  11/1991  Kakita et al. ..................... 354/81
5,361,115  11/1994  Ohtsuka et al. ................... 354/81
5,463,432  10/1995  Kahn ................................ 354/81

Primary Examiner—David M. Gray

[57] ABSTRACT

Recording/reproducing apparatus including recording electronics and playback electronics and a radio receiver responsive to a selected television signal for supplying a composite video signal to the recording electronics at selected times are contained within a unitary package designed to rest on a surface. A video camera supplies composite video signal for selective application to the recording electronics at other times, the supplying of those composite video signals to said recording electronics being done by means other than cabling from the video camera to the unitary package. The video camera is included within the same unitary package as the magnetic recording/reproducing apparatus in some systems, thus to eliminate cabling from the video camera to the unitary package. In other systems designed for photorecording without the need for an operator to attend the camera, the video camera is included with a low-power radio transmitter in a separate package from the unitary package including the magnetic recording/reproducing apparatus and the radio receiver. The low-power radio transmitter is designed to transmit the composite video signal from the video camera by wireless link to the radio receiver within the same unitary package as the magnetic recording/reproducing apparatus, thereafter to be recorded.

2 Claims, 22 Drawing Sheets

MAGNETIC RECORDING/REPRODUCING APPARATUS WITH VIDEO CAMERA, SUITED FOR PHOTORECORDING WITHOUT ATTENDING CAMERA OPERATOR

This application is a division of application Ser. No. 08/383,483 filed Feb. 2, 1995 which application is now pending.

The invention relates to systems combining magnetic recording/reproducing apparatuses with video cameras and, more particularly, to such systems suited for photorecording without an attending camera operator or photographer.

BACKGROUND OF THE INVENTION

In recent years, a magnetic recording/reproducing apparatus which is conventionally called a videocassette recorder (VCR) has been developed in various types. Such VCRs have been widely distributed and are now considered a virtual necessity for the home, with demand rapidly increasing. A VCR for home use generally uses half-inch tape recorded in accordance with the video home system (VHS) standard. Such a VCR is usually placed in the living room of a home to record television broadcasts and to reproduce the recorded broadcasts as desired.

Also in recent years, portable camcorders have been developed which record video signals so they can be played back using the above-described VCRs. This camcorder also uses half-inch or 8 mm tape. In such a portable camcorder, a photographer views an object via a viewfinder and photographs the object. Then, an image of the photographed object is recorded on a magnetic tape and the image can be reproduced by a user at any time. Portable camcorders with viewfinders that use liquid-crystal display devices for viewing the objects being photorecorded, rather than optical viewfinders, have been recently developed which permit playback from the magnetic tape to regenerate images on the liquid-crystal display devices. Portable camcorders are designed for use by a camera operator to function together with his eye and the rest of his body to become an extension of him.

The inventors point out there are a number of types of photorecording that are not very well implemented with a portable camcorder and are better implemented using differently configured systems of magnetic recording/reproducing apparatus and video camera, where the video camera is specifically designed for operation without the continuing attention of a camera operator and manipulation of the camera position by the camera operator. The presence of a camcorder operator tends to place a photographed person (subject) on his guard or feel self-conscious, so the subject will, intentionally or otherwise, behave in an unnatural manner. Although events (conferences, weddings, interviews, etc.) may be recorded using a camcorder and tripod, so that a camcorder operator need not attend the camcorder during photorecording, such camcorders are generally costly and the preparation and placement of a tripod is inconvenient. The weight of the recording/reproducing apparatus in the camcorder requires a tripod of substantial strength and stability, especially since a rather expensive camcorder is at risk of damage should tipping over of the tripod occur.

Certain types of surveillance, such as that used in banks or in other places of commerce subject to robbery, and such as that used in apartment buildings or factories where intruders may have to be later identified, are well-known applications in which photorecording customarily is performed without video cameras being attended. Systems of magnetic recording/reproducing apparatus and video camera for performing such surveillance use custom installations with individual magnetic recording/reproducing apparatus and video camera(s) connected by cabling of lengths to suit the particular installations.

The inventors point out that there exist markets for new systems of magnetic recording/reproducing apparatus and video camera, where the video camera is designed for operation without the continuing attention of a camera operator and where custom installation with the complications of providing cabling is not required or is so simplified that it can be done by anyone, rather than requiring technicians. One such new system, proposed by the inventors for home use, is one in which the video camera is packaged together with magnetic recording/reproducing apparatus designed for resting on a desk or table and being oriented for photorecording a desired field-of-view. Self-photography while seated at a desk or table, during the preparation of videotape "letters" to relatives and friends, could be found desirable by a number of persons. Using a portable camcorder, however, a photographer cannot easily photograph himself.

In other new systems suited for home use, the magnetic recording/reproducing apparatus can be contained in a first unitary package together with a radio receiver for receiving television signals transmitted from a video camera contained in a second unitary package together with a low-power radio transmitter for its video signals, which secondary package is small enough to be conveniently placed together with or in the first unitary package. The radio receiver is designed for receiving broadcast television signals and detecting video and audio signals therefrom. The separate package with the video camera and low-power radio transmitter is referred to in this specification and its claims as a "wireless satellite video camera". The word "satellite" as used in this in this specification and its claims does not refer to heavenly bodies, but rather refers to the linked relationship of a video camera to a magnetic recording/reproducing apparatus. The term "wireless satellite video camera" is to be construed to exclude the camera and radio transmitter combinations that use high-power radio transmitters such as encountered in television broadcasting, cablecasting or narrowcasting over long distances. Cabling between the satellite video camera and the magnetic recording/reproducing apparatus is avoided by using a wireless link from the video camera to the recording/reproducing apparatus. It is advantageous to use substantially the same form of modulation of the carrier in this wireless link as is used in broadcast television, so that the broadcast television receiver customarily included in a magnetic recording/reproducing apparatus for use in the home can be adapted to receive wireless transmissions from the video camera. To comply with broadcasting regulations, however, the channel for the wireless transmissions may be different than those used for television broadcasting in which case the tuner of the broadcast signal radio receiver is suitably adapted for receiving that channel in addition to normal broadcast channels. The wireless satellite camera can be equipped with remote control to control its operation (e.g. to control the tilt and pan of the camera, which remote control can use the same infra-red or radio-frequency remote control system used for the magnetic recording/reproducing apparatus, designs for those general types of remote control system being well known in the art. The video being recorded can be monitored by the remote camera operator by viewing a television receiver supplied signal from the magnetic recording/reproducing apparatus.

The satellite video camera can be designed for being detachably mounted on the magnetic recording/reproducing apparatus. Such a satellite video camera can be used in lieu of a video camera incorporated into the same package as the recording/reproducing apparatus. Or such a satellite video camera can be detachably mounted on the recording/reproducing apparatus so as to record a field-of-view different from the field-of-view recorded from a video camera incorporated into the same package as the recording/reproducing apparatus. Such arrangement permits the recording of two persons seated on opposite sides of a table on which the recording/ reproducing apparatus rests to be made on an alternative basis or on a split-field basis. This facilitates the preparation of videotape "letters" from more than one person, for example.

When photographing a meeting procedure using a camcorder, the camera should be directed toward a given speaker. In general, a photographer who manipulates the camera photographs each speaker individually. Otherwise, the photographing of several persons using a plurality of cameras generally requires editing of multiple photorecordings to assemble a single photorecording. However, the former case causes inconveniences due to the tracking and photographing of every speaker, while the latter case increases production costs. A better solution, the inventors believe, is to use a video camera than can be directed by remote control.

Another better solution, the inventors believe, is to use a video camera than can be automatically directed towards a source of sound to photograph the person currently speaking during the meeting. An audio direction recognition system using a pair of microphones which are spatially separated from each other to identify the direction of a second signal source with respect to a first signal source is disclosed in U.S. Pat. No. 4,581,758. The inventors point out that such an audio direction recognition system can be adapted for pointing a video camera, which is linked to magnetic recording/reproducing apparatus by wireless or is included within the apparatus.

Much of the disclosure provided in this specification and its drawing is drawn from the inventors' Korean patent applications Nos. 94-1982 and 94-9086 filed on 3 Feb. 1994 and on 28 Apr. 1994, respectively, which applications are incorporated herein by reference but not as essential matter for supporting the claims which follow this specification.

SUMMARY OF THE INVENTION

The invention in a broad aspect thereof is embodied in a system comprising a magnetic recording/reproducing apparatus and a radio receiver within a unitary package, the recording/reproducing apparatus including recording electronics and playback electronics, and the radio receiver being of a type responsive to a selected television signal for supplying a composite video signal to the recording electronics at selected times. A video camera in the system also supplies composite video signal for selective application to the recording electronics at other times, the supplying of those composite video signals to said recording electronics being done in accordance with the invention by means other than cabling from the video camera to the unitary package.

In certain systems embodying the invention in one of its aspects, the video camera is included within the same unitary package as the magnetic recording/reproducing apparatus, thus to eliminate cabling from the video camera to the unitary package.

In certain other systems embodying another aspect of the invention, the video camera is included with a low-power radio transmitter in a separate package from the unitary package including the magnetic recording/reproducing apparatus and the radio receiver. The low-power radio transmitter is designed to transmit the composite video signal from the video camera by wireless link to the radio receiver within the same unitary package as the magnetic recording/reproducing apparatus, thereafter to be recorded.

Other aspects of the invention concern solutions to particular problems encountered in the implementation of these systems, such as remote control of the wireless satellite video camera, automatic pointing of the video camera in the direction of a sound source, and automatic covering of the lens of a video camera included within the same unitary package as the magnetic recording/reproducing apparatus.

BRIEF DESCRIPTION OF THE DRAWING

FIG. 1 is a perspective view of magnetic recording/reproducing apparatus that, in accordance with an aspect of the invention, is contained in a unitary package together with a video camera and a radio receiver for supplying audio signal(s) and composite video signal demodulated from a television signal that receiver is tuned to.

DETAILED DESCRIPTION OF THE INVENTION

Figure 1:
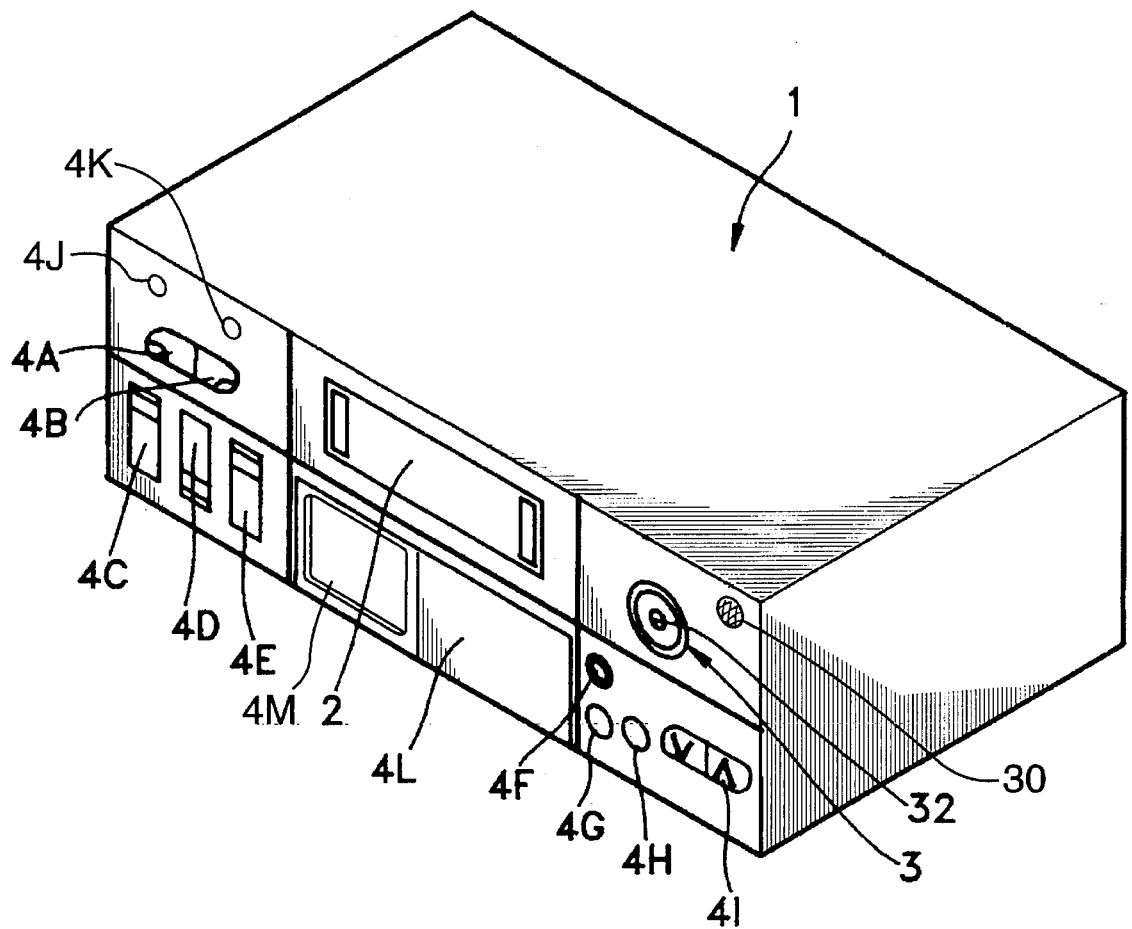

FIG. 1 is a perspective view of a main body 1 of magnetic recording/reproducing apparatus embodying the invention in certain of its aspects. The front panel of the main body 1 of this recording/reproducing apparatus has a door 2 installed therein, into which door 2 a cassette tape (not shown) can be inserted just as in a conventional magnetic recording/reproducing apparatus. The inserted cassette tape may be a half-inch VHS tape or an 8 mm tape. An opening is provided in the front panel for a video camera 3 used for photographing an object, which FIG. 1 depicts by way of illustration as being provided at the right side of the front panel. Another opening in the front panel, which FIG. 1 depicts by way of illustration as being provided at the right side of the front panel near the video camera 3, has a condenser microphone 30 installed therein.

In FIG. 1 the video camera 3 is permanently installed within the main body 1 of the system, although provisions are made in some embodiments for adjusting the direction in which its lens 32 points. These adjustments can be motorized and electronically controlled, as described further on in this specification. In less expensive apparatus only manual adjustment will be provided. The main body 1 is a unitary package for the recording/reproducing apparatus, the video camera 3, and a radio receiver for supplying audio signal(s) and composite video signal demodulated from a television signal that receiver is tuned to. By simply setting this main body 1 in a predetermined location (for example, on a desk) the video camera 3 can photorecord at conferences, at meetings or at home, without inconveniences associated with known types of camcorder. A more natural atmosphere can be produced than when photorecording with an ordinary video camera (or camcorder) because subjects take less notice that they are being photographed. The FIG. 1 apparatus can alteratively be used for monitoring or in connection with a door phone.

Various keys and lamps are installed in the front panel of the main body 1 to control and monitor the operation of the magnetic recording/reproducing apparatus with a built-in video camera. For example, a power button 4A, stop/eject button 4B, a fast search button 4C, display monitor switch 4D, a record lock-out key 4E, an eject button 4F, a record button 4G, a TV/VIDEO switching button 4H, a channel selection button 41, a pause lamp 4J, a reproducing lamp 4K, a control panel 4L by which a number of contrast and brightness adjustments can be made, and the display screen of a video monitor 4M, are further provided on the front panel. The video monitor 4M can be a small kinescope, but is preferably a liquid crystal display (LCD) device.

Design variations concerning the layout of the front panel of the main body 1 are possible, of course. Centering the video camera 3 on the front panel of the main body 1 over the door 2 makes adjusting the camera angle easier, for example, but tends to increase the height of the package. On the other hand, there is less possibility of the edge of a desk or table cutting off the bottom of the camera field-of-view when photorecording objects at some distance from the camera. If the main body 1 rests on a turntable, which permits the main body 1 to be rotated by a swivel motor, centering the video camera 3 on the front panel of the main body 1 is particularly desirable. The video camera 3 can be attached for swiveling on top of the main body 1 in another design variant, the swiveling of the video camera 3 alone requiring less swivel motor power than rotating the entire main body 1 and facilitating more rapid slewing. Placement of the door 2 such that it is least likely that the lens 32 of the video camera 3 will be banged into when attempting insertion of the video tape cassette into door 2 may be a design consideration. However, closing of the opening for camera 3 in the front panel when not photorecording greatly reduces this as a design consideration when planning a layout for the front panel.

Figure 2:
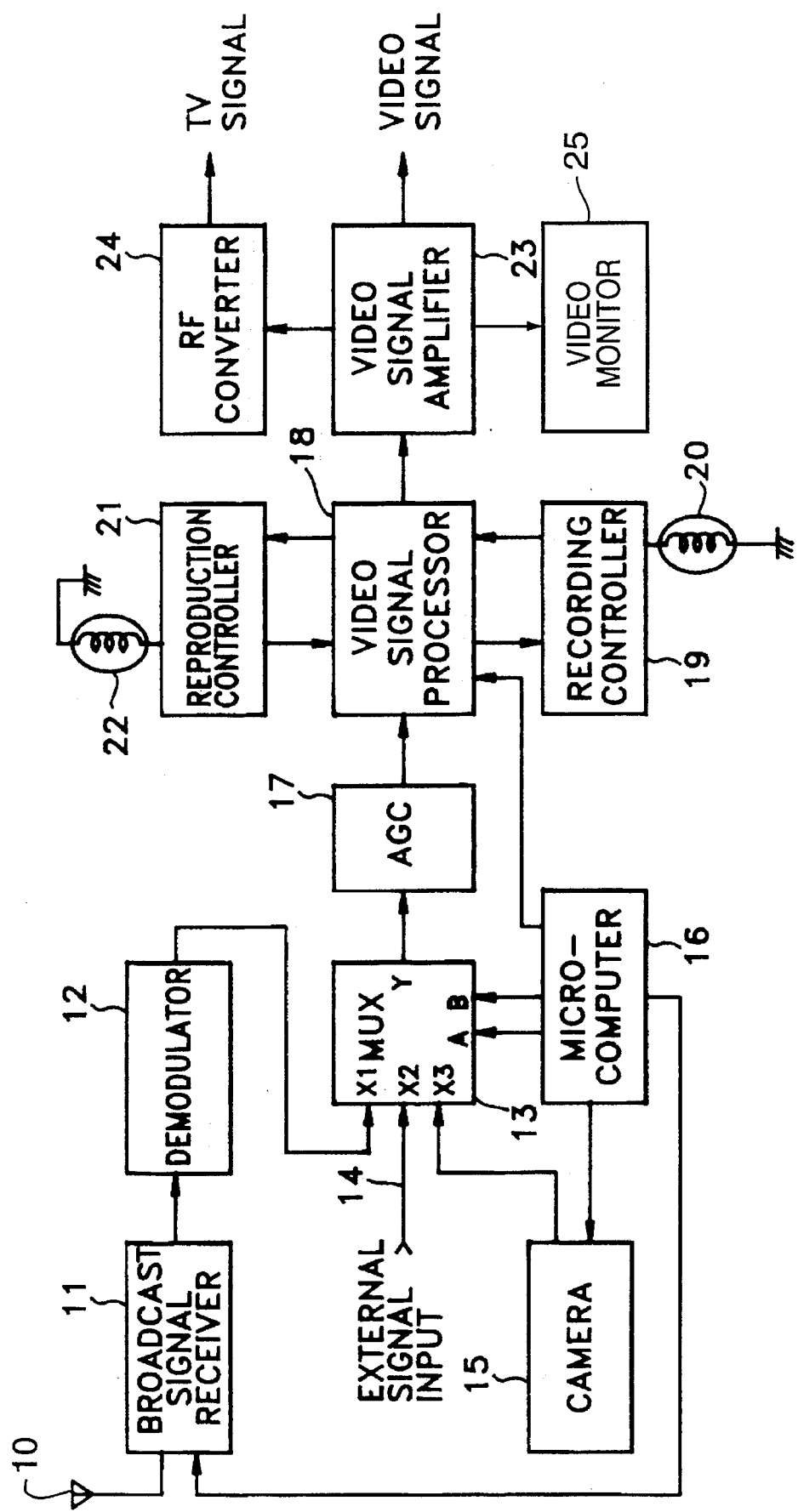
FIG. 2 is a block diagram of the electronics for the FIG. 1 apparatus.

FIG. 2 is an internal block diagram of the FIG. 1 the magnetic recording/reproducing apparatus with a built-in video camera. Referring to FIG. 2, a television broadcast signal (including a signal supplied from a wireless satellite video camera to be described with respect to FIG. 4) is supplied to a broadcast signal receiver 11 via an antenna 10. The broadcast signal receiver 11 tunes and supplies the input signal to a demodulator 12. The demodulator circuitry 12 demodulates the signal tuned in the broadcast signal receiver 11 into a video signal and audio signal. The demodulated signals are supplied to a first input port X1 of an input signal selector 13. The input signal selector 13 receives a signal from an external signal input 14 (e.g., via an audio/video jack)through a second input port X2, and receives the output signal of a video camera portion 15 through a third input port X3. The input signal selector 13 selects one of the signals supplied to first, second and third ports X1, X2 and X3 in accordance with the logic state of a control signal (AB) from a microcomputer 16. The input signal selector 13 depicted in FIG. 2 is a single multiplexer for selecting from among composite video signals with accompanying sound subcarriers, one for application to the microcomputer 16, but the invention is not confined to using such arrangement. Alternative arrangements are possible, each using a plurality of multiplexers for selecting various video- and audiosignal components to the microcomputer 16, as will be apparent to one skilled in the art.

The selected signal from the input signal selector 13 is supplied to an automatic gain controller (AGC) 17. The selected signal is maintained at a predetermined level by the AGC 17 and applied to a video signal processor 18. The video and audio signals processed in the video signal processor 18 are supplied to a recording controller 19 to be recorded onto magnetic tape (not shown) by a recording head 20. The signals reproduced by a reproducing head 22 are supplied through a reproducing controller 21 back to the video signal processor 18. The signals processed by the video signal processor 18 are supplied to a video signal amplifier 23 and are available for application to a television screen or monitor (not shown). A composite video signal supplied from the video signal amplifier 23 is converted by RF converter 24 into a radio-frequency television signal receivable by a television receiver. Another composite video signal is supplied from the video signal amplifier 23 to a small video monitor 25 having its display screen 4M on the front panel of the magnetic recording/reproducing apparatus.

The FIG. 2 circuitry permits selection for photorecording among at least three input signals. A first input signal an ordinary broadcast signal (or an audio/video signal modulated onto a broadcast frequency) is tuned in broadcast signal receiver 11 and demodulated in demodulator circuitry 12. Thereafter, the signal is supplied as a video signal and audio signal to a port X1 of the multiplexers functioning as the input signal selector 13. Also, external signal input 14 receives an ordinary video signal and audio signal from a general piece of audio/video equipment, or from an external piece of equipment for generating an audio/video signal, which signals are supplied to a port of the multiplexers functioning as the input signal selector 13.

Further, from camera portion 15, a sequence of photoimages converted into an electric video signal by video camera 15 (corresponding to the video camera 30 and lens 32 of FIG. 1) and an audio signal supplied from condenser microphone 30 (refer to FIG. 1 ) are supplied to a port X3 of the multiplexers functioning as the input signal selector 13. The input signal selector 13 selects one of these input signals, according to the logic states of the control signal (AB) of the microcomputer 16 as shown in Table 1 below, "L" representing a "low" logic state, and "H" representing a "high" logic state.

TABLE 1

| control inputs | | selected output |
|---|---|---|
| A | B | Y |
| L | L | X1 |
| L | H | X2 |
| H | L | X3 |

As shown in Table 1, the input signal selector 13 selects a broadcast signal if the control signal is "AB=LL." If the control signal is "AB=LH," an external input signal is selected. The camera signal is selected if the control signal is "AB=HL." Alternative control logic can be used, as one skilled the art will appreciate.

Figure 3:
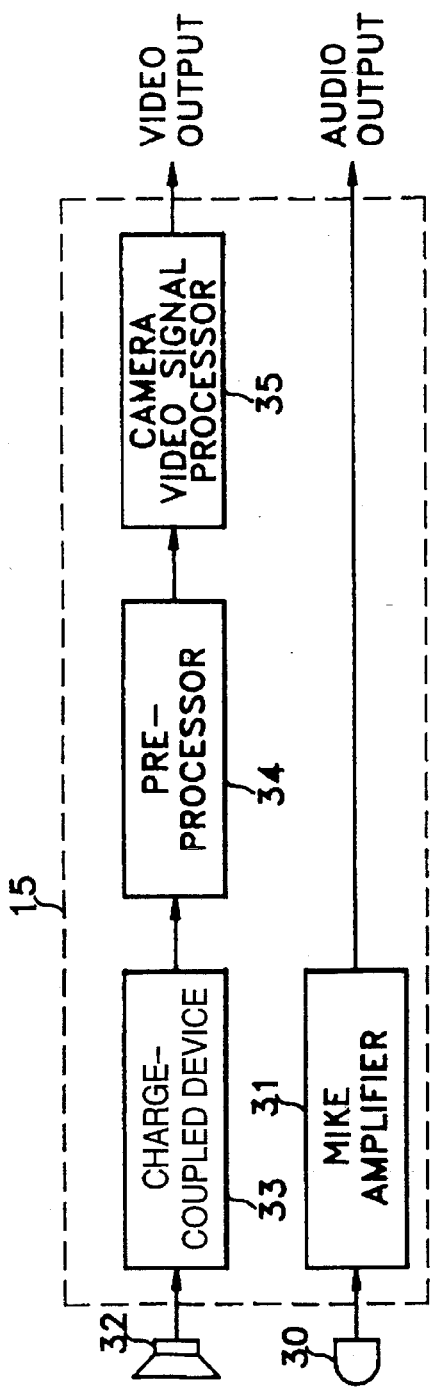
FIG. 3 is a detailed block diagram of the camera portion shown in FIG. 2, which is as known in the prior art.

FIG. 3 is a detailed block diagram for the video camera 15 shown in FIG. 2. According to FIG. 3, an audio input to condenser microphone 30 is amplified by a microphone amplifier, or "mike" amplifier, 31. Concurrently, the object information acquired via the camera lens 32 is convened into an electric signal by a charge-coupled device 33. The resulting electric signal is provided to a pre-processor 34, which performs correlated double sampling and automatic gain control on the electric signal and provides the pre-processed electric signal to a camera video signal processor 35. The camera video signal processor 35 converts pre-processor 34 signals to video signal having the same general form as the video signal from the demodulator circuitry 12. This video signal may be a composite video signal, or a video signal supplied in a component signals form. The video signal supplied from camera video signal processor 35 together with the amplified audio output supplied from the mike amplifier 31 form the combined output signal from the camera 15.

Figure 4:
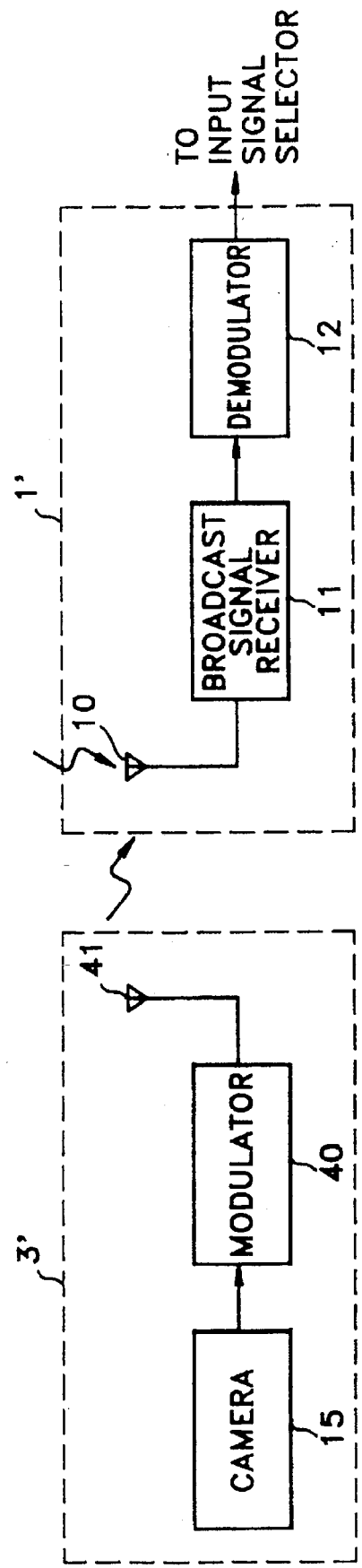
FIG. 4 is a block diagram of the electronics linking a wireless satellite video camera together with the FIG. 1 magnetic recording/reproducing apparatus or with conventional magnetic recording/reproducing apparatus including a radio receiver, but no video camera, in accordance with aspects of the invention.

FIG. 4 is a block diagram of electronics for linking a wireless satellite video camera 3' together with the radio receiver portion 1' of the main body 1 of the FIG. 1 magnetic recording/reproducing apparatus or of conventional magnetic recording/reproducing apparatus without video camera. This wireless satellite video camera 3' transmits a video signal and audio signal to the radio receiver portion 1' of the main body 1 of the magnetic recording/reproducing apparatus. The wireless satellite video camera 3' can be installed anywhere within the reception range for its low-power radio transmitter. Compared to the apparatus shown in FIG. 2, the magnetic recording/reproducing apparatus shown in FIG. 4 has the same configuration except that the video camera 15 is a satellite camera of special wireless type. Accordingly, a magnetic recording/reproducing apparatus embodying the invention may use either a video camera packaged together therewith in an incorporated fashion as shown in FIG. 1 or a wireless satellite video camera (installed anywhere) as shown in FIG. 4, to record and/or monitor photographed signals. With plural wireless satellite video cameras being employed, the magnetic recording/reproducing apparatus can perform a monitoring function by selecting between or among those wireless cameras using the tuner of the radio receiver packaged together with the recording/reproducing apparatus.

Figure 5:
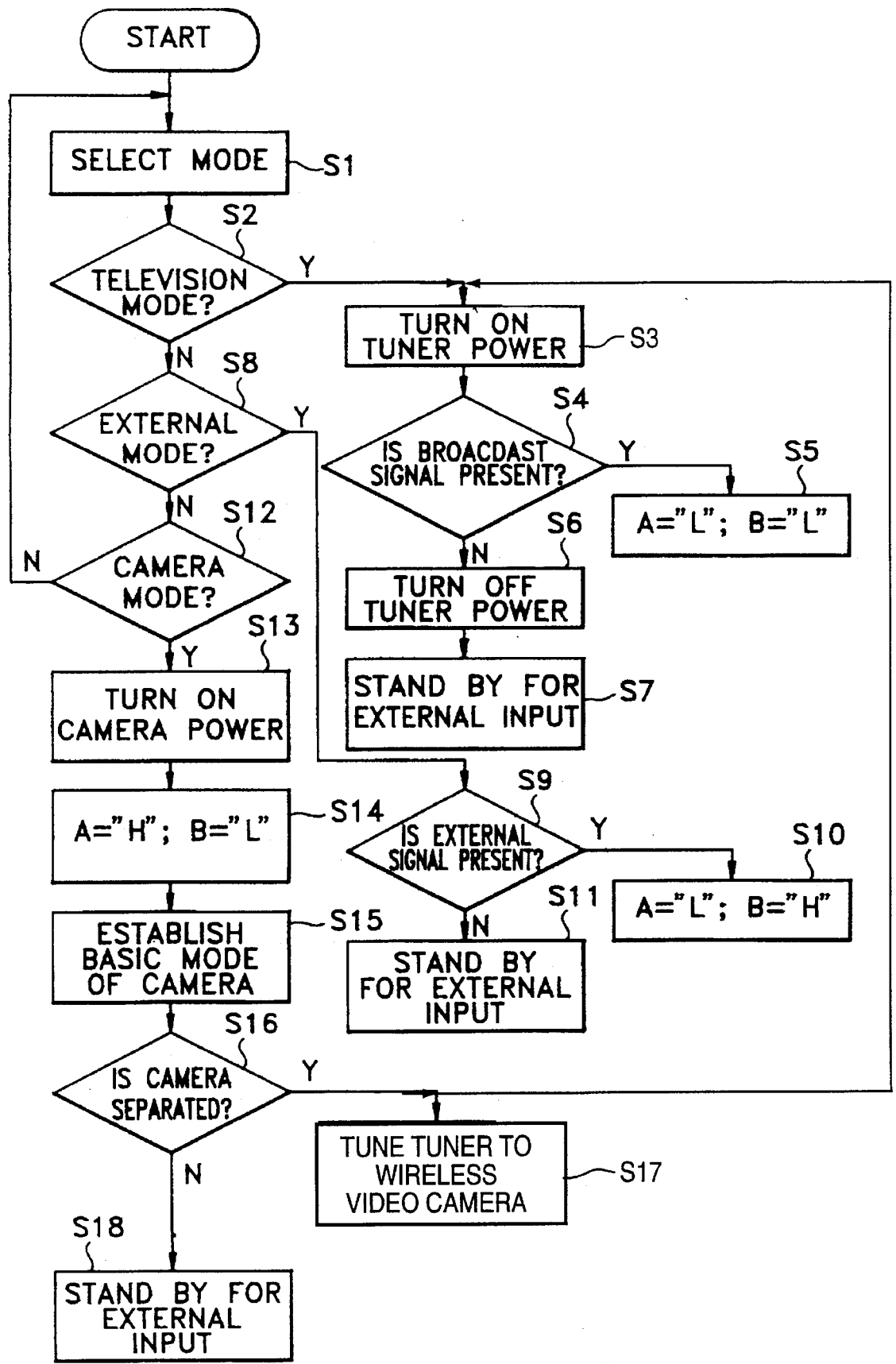
FIG. 5 is a flowchart diagram showing the general operation of the FIG. 1 magnetic recording/reproducing apparatus including a video camera.

FIG. 5 is a flowchart diagram showing general operation of the camera-integrated magnetic recording/reproducing apparatus in FIG. 1, when it is modified such that the video camera 3 can be detached from the main body 1, as will be described in detail further on in this specification, with reference to FIGS. 9, 10, 11, 12A, 12B and 13 of the drawing.

Referring to FIG. 5, when a mode selection key is actuated by a user (step S1), the microcomputer 16 determines the currently selected mode (steps S2, S8 and S12). If the currently selected mode is a television mode, the microcomputer 16 applies power to the broadcast signal receiver 11 (step S3). With power applied to the broadcast signal receiver 11, it is determined whether a broadcast signal is applied to the input (step S4). If it is, the microcomputer 16 outputs low selection control signals A and B (AB="LL"; see Table 1 above) to the input signal selector 13, which responds to select a broadcast signal input (step S5). If the input of a broadcast signal is not present or is discontinued, the microcomputer 16 turns off the power of the broadcast signal receiver 11 (step S6), and the apparatus of FIG. 2 enters a standby mode waiting for an external input (step S7). This standby mode allows the microcomputer 16 to perform other functions.

If the television mode is not selected according to the result of step S2, the microcomputer 16 determines whether an external mode is selected (step S8). If the external mode is selected and it is determined that an external signal is supplied to the input signal selector 13 (step S9), the microcomputer 16 supplies a control signal as "AB=LH" to the input signal selector 13, conditioning it to select the external signal as input signal to the automatic gain controller 17 (step S10). If there is no external signal, the standby mode is entered (step S11).

If the external mode is not selected according to step S8, the microcomputer 16 determines whether a camera mode is selected (step S12). If the camera mode is selected, the microcomputer 16 applies power to the video camera 15 to enable its operation (step S13) and supplies the control signal as "AB=HL" to the input signal selector 13(step S14). The video camera 15 is conditioned to operate in a basic mode (step S15), in which its power is drawn from the recording/reproducing apparatus rather than from its own batteries, the modulator 40 is turned off, and the input signal selector 13 receives video signal from the video camera 15 directly rather than through a wireless link. The basic mode is a mode for operating the camera incorporated within or attached within the magnetic recording/reproducing apparatus. In step S16 it is determined whether or not the camera is detached or separated from the magnetic recording/reproducing apparatus. If the camera is detached or separated from the magnetic recording/reproducing apparatus, the operation loops back to step S3 to turn on power to the tuner, and the tuner is automatically tuned to receive the channel on which the wireless satellite video camera transmits (step S17). If the camera is not detached or separated from the magnetic recording/reproducing apparatus, the standby mode is set (step S18). In the camera mode, the video signal and audio signal of the photographed object are recorded onto magnetic tape whether or not the video camera is separated from the magnetic recording/reproducing apparatus.

In the FIG. 1 magnetic recording/reproducing apparatus having the video camera packaged together therewith in a unitary package, the lens 32 is exposed; and foreign matter such as dust may become attached to the lens. This prevents a sharp image from being obtained. The exposure of the lens 32 may also involve damage due to contact or breakage due to an external impact. As described earlier in this specification, damage to the lens 32 when attempting to insert the video tape cassette into the door 2 in the front panel of the main body 1 is of particular concern.

Figure 6:
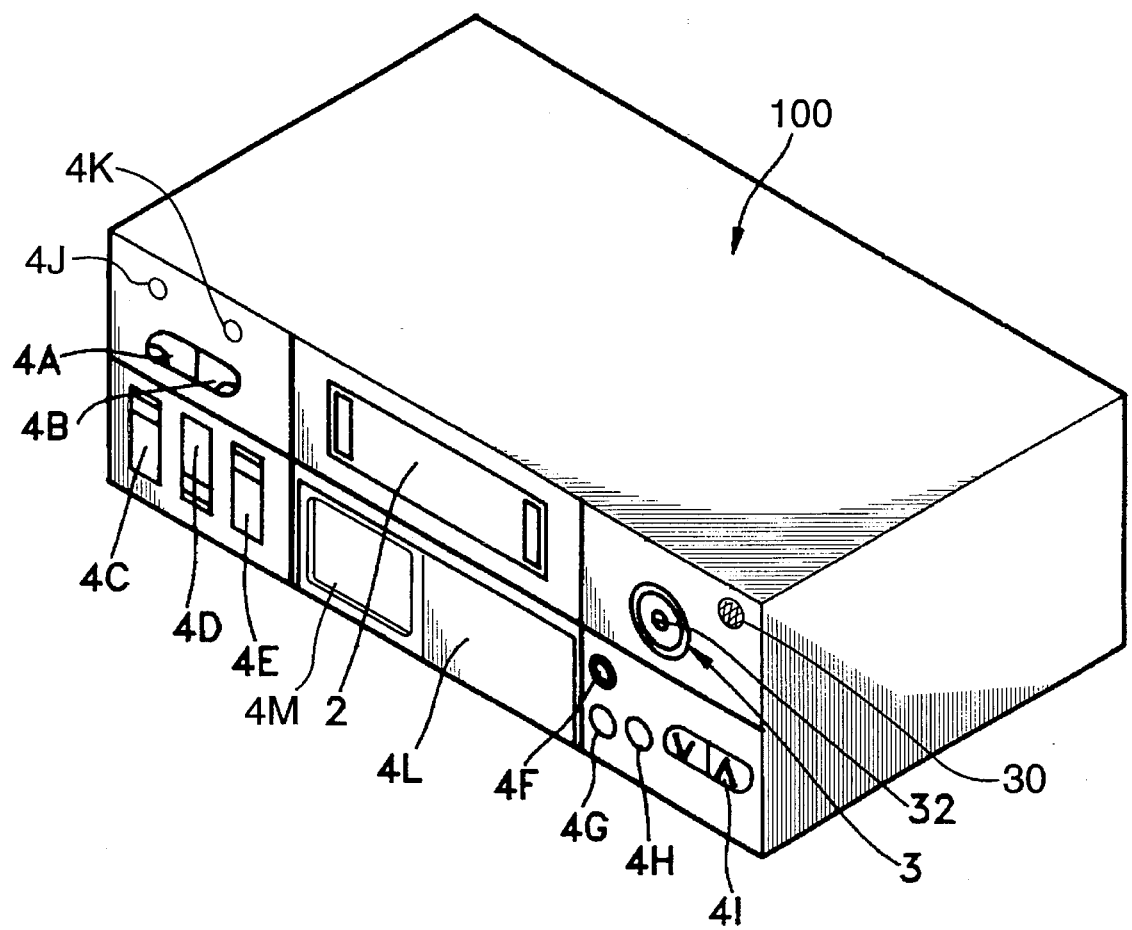
FIG. 6 is a perspective view of the FIG. 1 magnetic recording/reproducing apparatus as modified in accordance with a further aspect of the invention to provide an automatic lens-cover opening/closing device for the video camera included therein.
Figure 7:
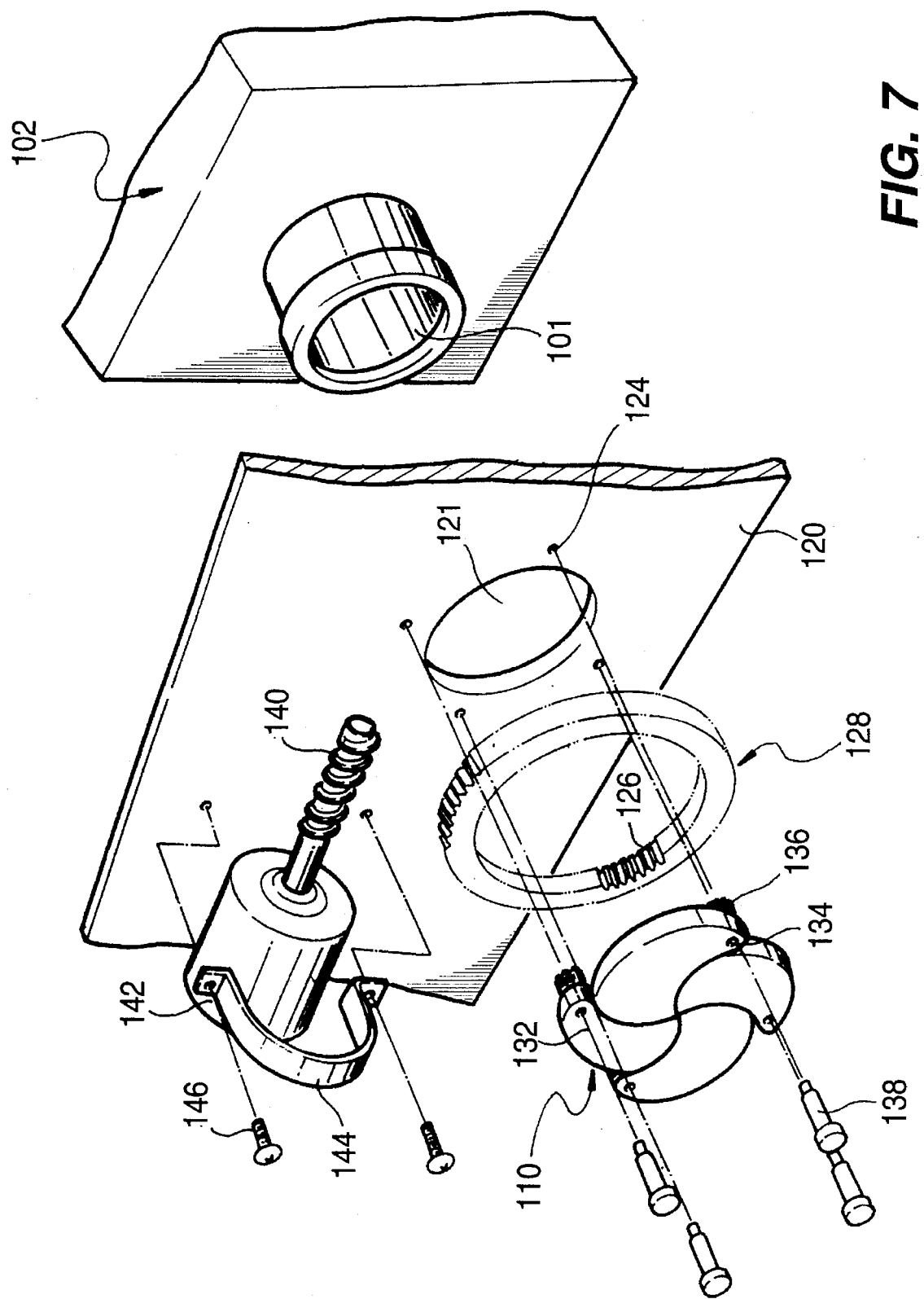
FIG. 7 is an exploded perspective view of the FIG. 6 automatic lens-cover opening/closing device in its closed state.
Figure 8:
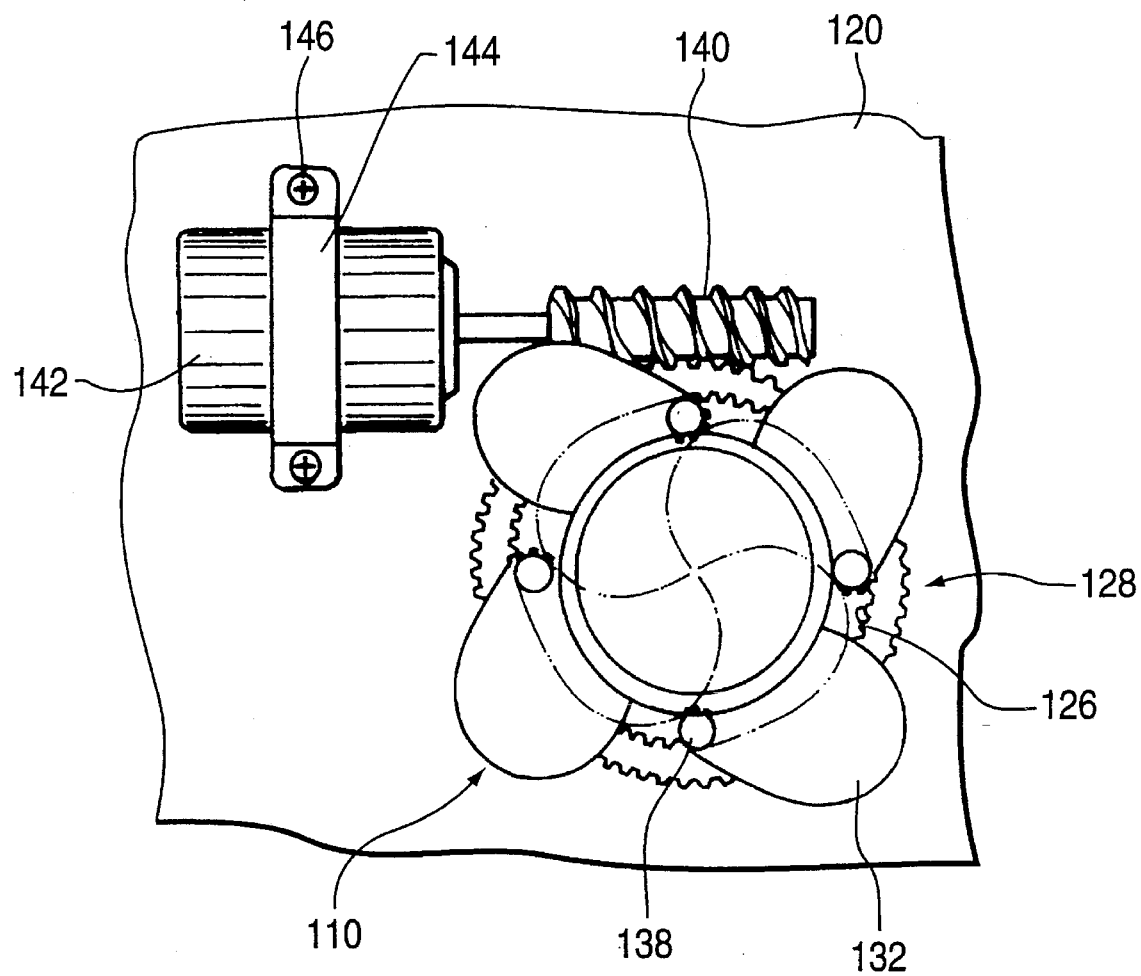
FIG. 8 is a front view of the automatic lens-cover opening/closing device shown in FIG. 7 in its opened state.

FIG. 6 is a perspective view of a modification of the FIG. 1 apparatus to include an automatic lens-cover opening/closing device 110 for the lens 101 of the video camera contained within its main body 100, which modification is made in accordance with a further aspect of the invention. Except for the renumbering of elements 1 and 32, the same reference numerals as those of FIG. 1 represent like components in FIG. 6. FIGS. 7 and 8 are an exploded perspective view and a front view, respectively, of the automatic lens-cover opening/closing device 110.

Referring to FIG. 7, in the automatic lens-cover opening/closing device that embodies the invention in one of its aspects, lens 101 is mounted in the body 102 of the video camera and is pointed towards a fixed plate 120 having a lens hole 121 therethrough. A plurality of fitting holes 124 are formed at equal intervals surrounding the lens hole 121 and extend at least part way through the fixed plate 120 from its front side. A worm wheel 128 of a ring shape has an internal gear 126 surrounding the respective fitting holes 124 in the fixed plate 120. Cover 110 for protecting the lens 101 is located on the other side of the worm wheel 128 from the fixed plate 120.

The cover 110 comprises at least two component pieces 132. Through-holes 134 are formed through the respective component pieces 132, those through-holes opposing respective ones of the fitting holes 124 through the fixed plate 120. A respective gear 136 engaging with the internal gear 126 of the worm wheel 128 protrudes from the periphery of one side of each of the component pieces 132 with a respective one of the through-holes 134 passing through a center of rotation for that gear 136. The respective component pieces 132 of the cover 110 are movable with respect to the fixed plate 120, rotating around respective ones of a plurality of fixing pins 138 fitting with clearance through the through-holes 134 and force-fitted into fitting holes 124 in the front side of the fixed plate 120.

The component pieces 132 of the cover 110 are preferably shaped into a pattern for avoiding interference with one another, appropriate patterns being known to those skilled in the art of designing shutters and irises for cameras. The worm wheel 128 is rotated by a worm gear 140 engaging therewith, which worm is on the motorshaft of a driving motor 142. The motorshaft of the driving motor 142 is conditioned for forward rotation or reverse rotation according to the turning on of power to the video camera when it is to be in use or the turning off of the power to the camera when it is no longer to be in use. The driving motor 142 is held in fixed position respective to the fixed plate 120 by a U-shaped fixing band 144 and screws 146. The fixed plate 120 is mounted behind the front plate of the main body 100 and parallel thereto at a sufficient remove to provide clearance for the driving motor 142 and the U-shaped fixing band 144.

When the power for using the camera is initially applied, the motorshaft of the driving motor 142 is rotated in a forward direction to rotate the worm gear 140 on that shaft and thereby rotate the worm wheel 128 engaging with worm wheel 128 in a forward direction, which is to say clockwise as viewed from the lower left of FIG. 7. Thus, respective component pieces 132 gears 136 of which engage with the internal gear 126 of the worm wheel 128 are rotated clockwise (as viewed from the lower left of FIG. 7) around respective the fixing pins 138, to open the cover 110. When the cover 110 is fully opened, a sensor (not shown) detects this state and provides this information to the microcomputer 16 of FIG. 2. The microcomputer 16 detects the input to stop the driving of the driving motor 142 so that the cover 110 is kept opened while the camera is being used. The pitch of the worm gear 140 is such that it cannot be turned by the worm wheel 128, which locks the cover 110 in the position it has when the motorshaft of the driving motor 142 stops its rotation.

When the use of the camera is discontinued, the microcomputer 16 generates a control signal for rotating the shaft of the driving motor 142 in a reverse direction and provides the control signal to the driving motor 142. The driving motor 142 responds to this control signal by reverse rotation of its shaft and the worm wheel 128 engaging with the worm gear 140 formed on motorshaft of the driving motor 142 is rotated in reverse direction, which is to say counterclockwise as viewed from the lower left of FIG. 7. Thus, the respective component pieces 132 of the cover 110 are rotated counterclockwise (as viewed from the lower left of FIG. 7) around respective ones of the fixing pins 138 by their gears 136 engaging with the internal gear 126 of the worm wheel 128. This operation closes the cover 110. When the cover 110 is fully closed, a sensor (not shown) detects this state and provides this information to the microcomputer 16 of FIG. 2. The microcomputer 16 detects the input to stop the driving of the driving motor 142, so that the cover 110 is kept closed while the camera is not in use.

As described above, in the FIG. 6 magnetic recording/reproducing apparatus containing the video camera 3 within its main body 100, if the power is applied when the camera is used, the cover opens automatically. If the power is turned off when use of the camera is discontinued, the cover closes automatically. For this reason, foreign matter does not become attached to the lens and efficiently protects the lens from external elements.

Figure 9:
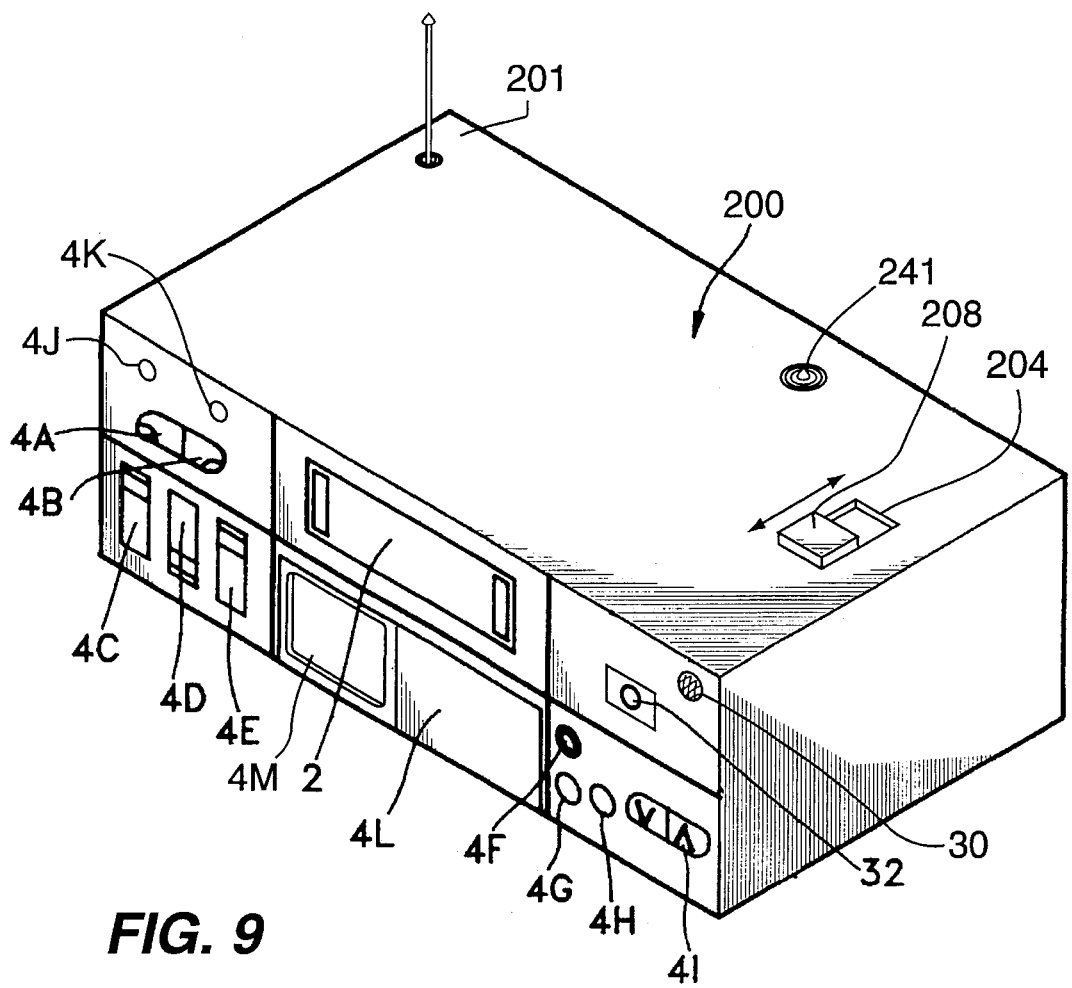
FIG. 9 is a perspective view of the magnetic recording/reproducing apparatus of FIG. 1 modified to include a detachable wireless satellite video camera attached to the main body of the apparatus by a camera attaching/detaching device according to still another embodiment of the invention.
Figure 10:
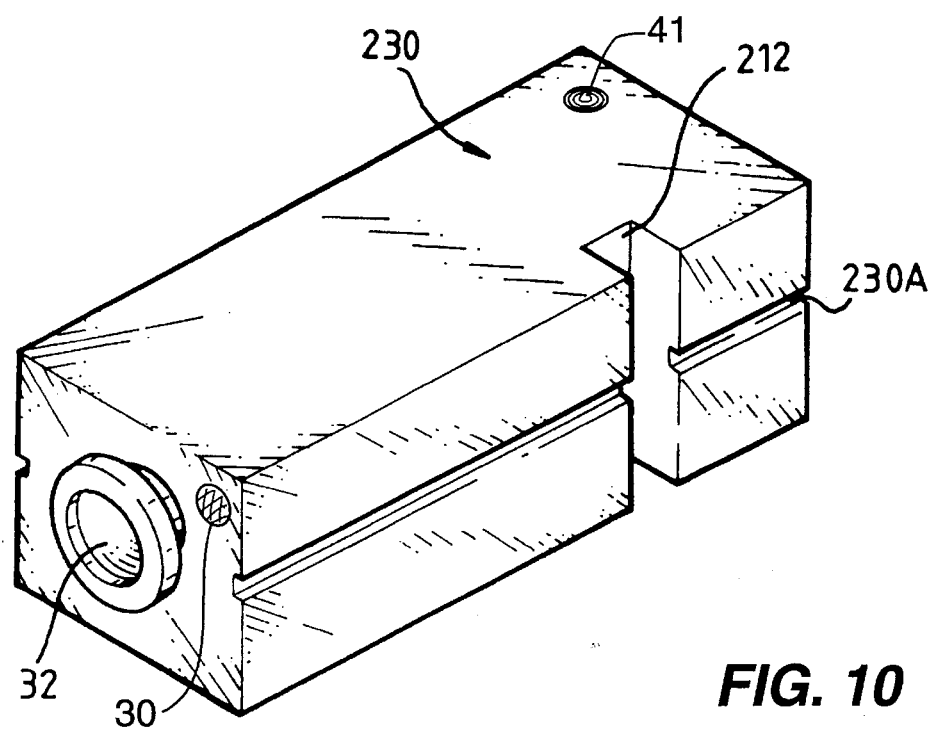
FIG. 10 is a perspective view of a detachable wireless satellite video camera separated from the FIG. 9 magnetic recording/reproducing apparatus.

FIG. 9 is a schematic perspective view of a magnetic recording/reproducing apparatus having a detachable video camera 230 per FIG. 10 associated therewith, which FIG. 9 apparatus differs from the apparatuses shown in FIGS. 1 and 6 in that the video camera can be attached within a main body 200 of the apparatus or can be detached from the main body 200 in accordance with a further aspect of the invention. A still further aspect of the invention is the attaching/detaching device used to implement this further aspect of the invention. In FIG. 9, the same reference numerals as those of FIGS. 1 and 6 represent like components and will therefore be omitted from the following detailed description.

Figure 11:
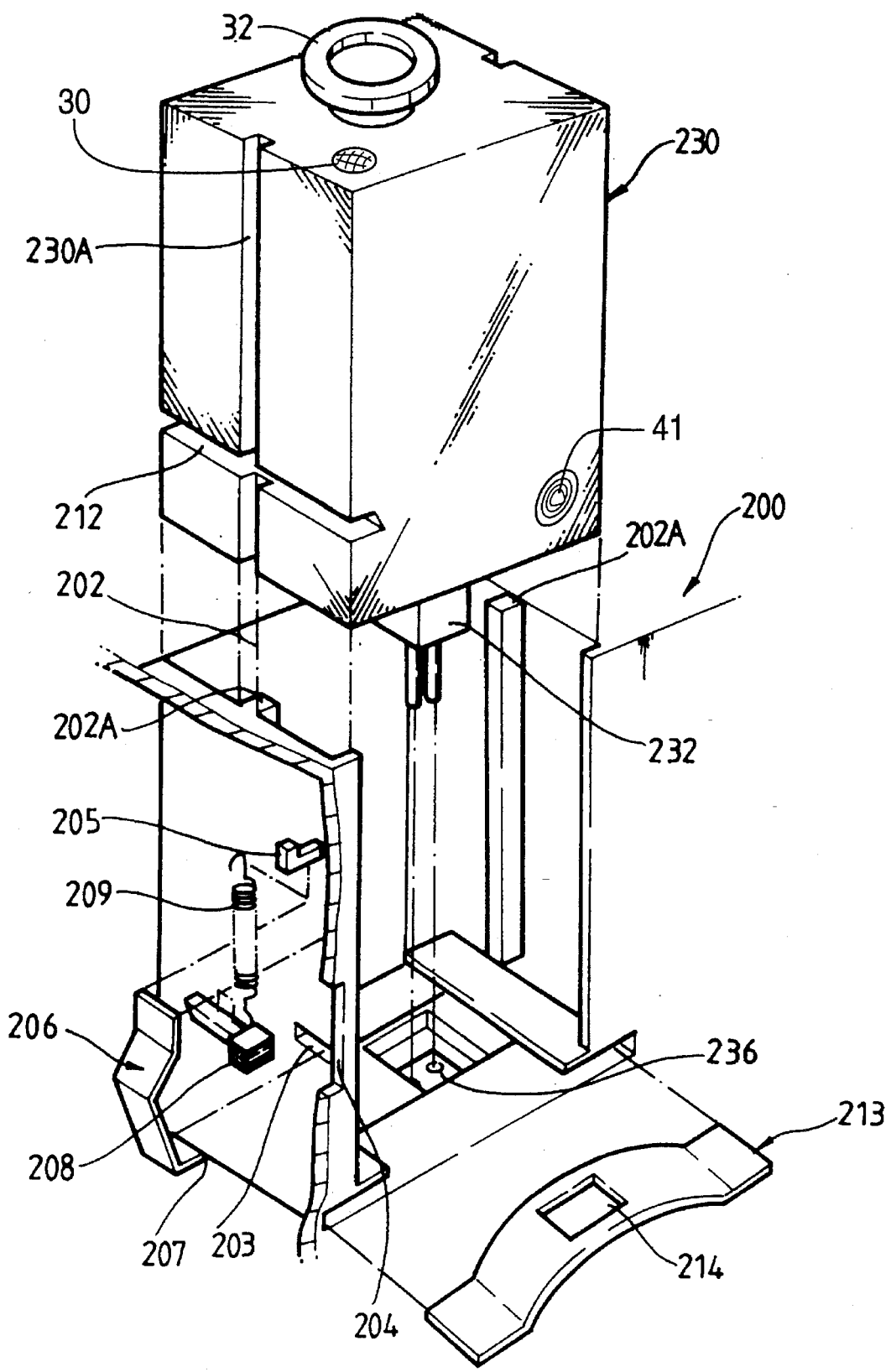
FIG. 11 is a perspective view of the detachable wireless satellite video camera and the attaching/detaching device shown in FIG. 9, separated from each other.

As shown in FIG. 9, the camera attaching/detaching device, which will be explained with reference to FIGS. 11 and 12, is mounted on the top surface of the main body 200 with a guide slot 204 therein guiding a slide knob 208 used for detaching the detachable video camera 230, so the camera can be withdrawn from an opening in the front panel of the main body 200. Insertion and withdrawal of the detachable video camera 230 through the front panel is preferred since the FIG. 9 apparatus may be placed so the other sides of the main body 200 are not readily accessible, as when the apparatus is stowed within a cabinet with other audio/video equipment. While FIG. 9 shows a slide knob 208 on the top surface of the main body 200 being available for disengaging the detachable video camera 230 from the main body 200, modifications can be made in which the guide slot 204 is located on a lateral side of the main body 200 with the slide knob 208 structure suitably modified. Also modifications can be made in which a push-button on the front panel of the main body 200 actuates the slide mechanism.

FIG. 10 is a perspective view of the detachable video camera 230 as it appears after having been being detached from the FIG. 9 magnetic recording/reproducing apparatus and withdrawn from a cage 202 or coupling groove in its main body 200 through a front panel thereof. The detachable camera 230 is preferably a wireless video camera that includes the circuits shown in FIG. 4, in which case the camera 230 will include arrangements for placing batteries therewithin for powering its camera 15 and modulator 40 components when detached from the main body 200.

From the viewpoint of extending battery life it is preferable to make provisions such that, when the detachable video camera 230 is attached to the main body 200, it makes electrical connections for recharging its batteries. The antenna 41 is preferably of a telescopic vertical rod type, shown in FIG. 10 as being collapsed into the body of the video camera 230 to allow insertion into and withdrawal from the camera cage 202. The collapsing of the antenna can be used to switch off power to the modulator 40 in the video camera 230.

The main body 200 of the FIG. 9 magnetic recording/reproducing apparatus includes in its top surface another antenna 201 preferably of a telescopic vertical rod type that can be used as the antenna 10 for the broadcast signal receiver when establishing a wireless link from the detached video camera 230. Alternatively, a rod antenna can swing up from the back surface of the main body 200. The main body 200 can, as shown in FIG. 9, include a hole 241 in its top surface permitting the antenna 41 to be extended after the camera 230 is inserted into and attached to the main body 200. This permits the low-power transmission of television signals descriptive of objects photographed by the detachable camera 230 to a closeby television receiver, and arrangements can be made for transmitting to a closeby television receiver via the antenna 41 those signals reproduced by the magnetic recording/reproducing apparatus. The vertical rod antennas 201 and 41 are preferred partly because of their omnidirectional transmission and reception characteristics and partly because they have reduced sensitivity to horizontally polarized television broadcast signals. The camera cage 202 will now be described in detail with reference to FIG. 11.

FIG. 11 shows the FIG. 9 apparatus resting on its back panel, so the top of the main body 200 would be viewed from the lower right of FIG. 11 and the left side panel of the main body 200 would be viewed from the lower left of FIG. 11. The outside covering of the main body 200 is removed, however, in FIG. 11 to reveal internal structure of the main body 200. The cage 202 for the camera 230 is formed within the main body 200 with the opening of the camera cage 202 for insertion of the video camera 230 therein being in the front panel of the main body 200, which is viewed from the top of FIG. 11. From the lower left of FIG. 11 one views a wall of the camera cage 202 that is separated by a clearance space from the left side panel of the main body 200. Respective guide protrusions 202A are formed on the lateral inside surfaces of the camera cage 202. A fitting hole 203 is formed in the side of the camera cage 202. A rocker 206 having a bracket-like shape, which has a predetermined resilience and a stop 207 protruded at its free end into the camera cage 202 through a firing hole 203, is captively installed inside the main body 200 of the magnetic recording/reproducing apparatus. Preferably the rocker 206 is made from a springy plastic, but it can be formed from spring metal. Separation-type video camera 230 is capable of being attached or detached from the camera cage 202 within the main body 200 of the magnetic recording/reproducing apparatus. A fitting groove 212 into which the stop 207 of the rocker 206 is elastically fitted is formed on one side of the video camera 230 and opposes the fitting hole 203. The rocker 206 is installed to be movable while being in slidable contact with a slide knob 208 for disengaging the stop 207 of the rocker 206 from the fitting groove 212 of the video camera 230, when the slide knob 208 slides towards the back of the main body 200 of the magnetic recording/reproducing apparatus through a guide slot 204 in its top surface. A spring stop 205 is formed on one inner side of the main body 200 of the magnetic recording/reproducing apparatus. A coil spring 209 is installed between spring stop 205 and the slide knob 208 and is operated in tension to provide a resilient means for elastically biasing slide knob 208.

A connector 236 is installed in the rear wall of the camera cage 202 to receive a plug 232 on the back of the video camera 230. A leaf spring 213 is installed at the rear of the camera cage 202, operating in compression to provide a resilient means elastically coming into contact with the video camera 230 and for protruding the video camera 230 by a predetermined distance in the direction of separation from the main body 200 of the magnetic recording/reproducing apparatus when the stop 207 of the rocker 206 is disengaged from the fitting groove 212 of the video camera 230. A square through-hole 214 is formed in leaf spring 213, to allow access for the plug 232. A guide groove 230A being in slidable contact with guide protrusion 202A is formed in each of the left and right sides of the detachable video camera 230.

For purposes of clearly illustrating the basic mechanism of the camera attaching/detaching device, FIG. 11 depicts the slide knob 208 as being of a form that least obscures the other elements of the camera attaching/detaching device. In actual practice the slide knob 208 is likely to have a dust collar to prevent dust settling through the guide slot 204, which dust collar can be of rectangular form that slides against the upper surface of the main body 200. The dust collar can be arranged to slide in channel brackets to provide further supporting and guiding mechanism for the slide knob 208.

Figure 12A:
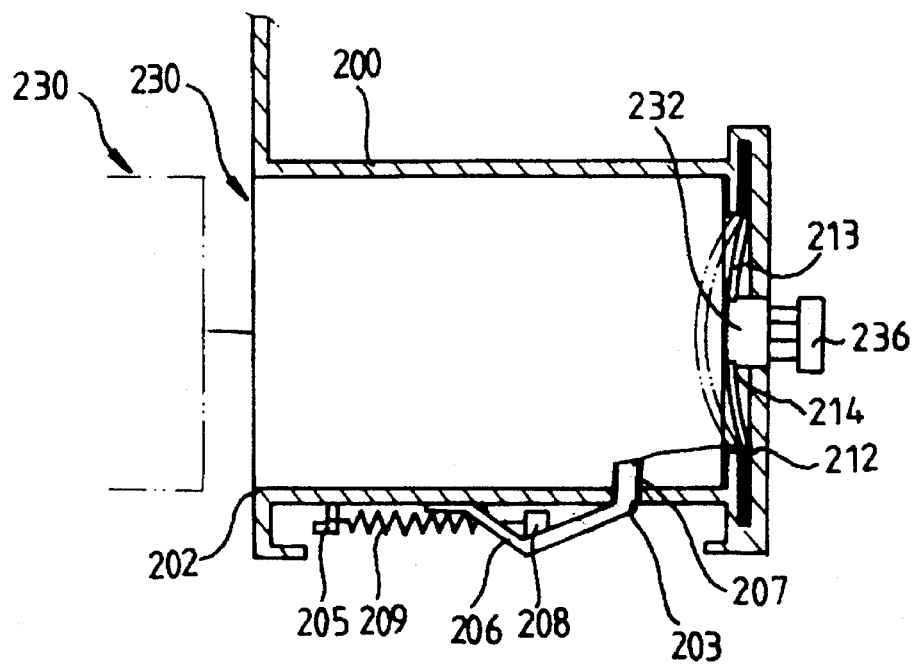
FIGS. 12A and 12B are cross-sectional views from the top showing states in which the detachable wireless satellite video camera shown in FIG. 11 is respectively combined with and separated from the main body of the FIG. 9 magnetic recording/reproducing apparatus.
Figure 12B:
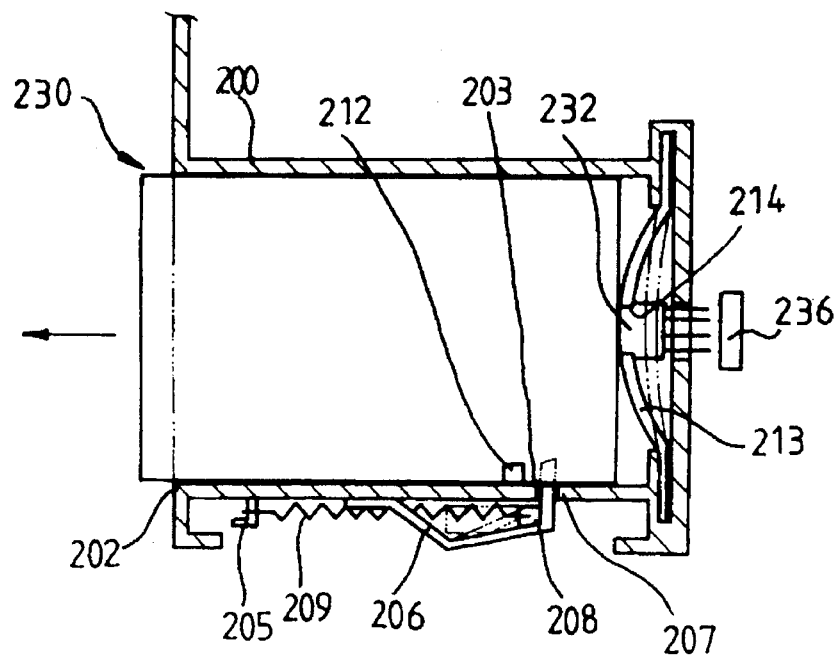

The operation of the camera attaching/detaching device used in an aspect of the invention will be described below, with reference to FIGS. 12A and 12B which are cross-sectional views from the top. The front panel and the right-hand side panel of the main body 200 are to the left and to the bottom, respectively, in these cross-sectional views First, in the case when the video camera 230 is inserted into the main body 200 of the magnetic recording/reproducing apparatus, as shown in FIG. 12B, before the plug 232 of the video camera 230 is inserted into the connector 236 in the rear wall of the camera cage 202 as shown in FIG. 12A, the rocker 206 is elastically deformed by the stop 207 provided by its free end being pushed out by the side of the video camera 230; and the rear of the video camera 230 comes into contact with the leaf spring 213. When the video camera 230 is fully inserted into the camera cage 202 as shown in FIG. 12A, the plug 232 of the video camera 230 is inserted into the connector 236 in the rear wall of the camera cage 202, the leaf spring 213 is compressed and elastically deformed. The stop 207 fits into the fitting groove 212 of the video camera 230 so that the rocker 206 returns to its original state by its own resilient force. This locks the detachable video camera 230 within the main body 200 of the magnetic recording/reproducing apparatus. In this state, the video camera 230 operates as explained with reference to FIGS. 1–5 for photorecording an object.

When the video camera 230 is detached from the main body 200 of the magnetic recording/reproducing apparatus, as the slide knob 208 installed in the guide slot 204 of the main body 200 of the magnetic recording/reproducing apparatus is moved back from its normal position, the rocker 206 is elastically deformed so that the stop 207 is disengaged from the fitting groove 212 in the side of the video camera 230. Simultaneously, the resilient force of the leaf spring 213 returns it substantially to its original non-compressed state, to cause the video camera 230 to protrude by a predetermined length outward from the camera cage 202. A coil spring 209 returns the slide knob 208 to its initial normal position. The rocker 206 is elastically deformed with the stop 207 being in contact with the lateral surface of the video camera 230. Subsequently, as the video camera 230 is completely withdrawn from its cage 202, the rocker 206 returns to the initial state by its own resilient force.

The camera attaching/detaching device described above permits detachment of the video camera 230 from the main body 200 of the magnetic recording/reproducing apparatus, thus to allow an object to be photographed at various angles without having to move the main body 200 of the magnetic recording/reproducing apparatus. The insertion of the plug 232 of the video camera 230 into the connector 236 in the rear wall of the camera cage 202 when the video camera 230 is attached to the main body 200 permits the video and audio signals to be supplied from the video camera 230 to the input port X3 of the input signal selector 13 in the FIG. 2 electronics. The insertion of the plug 232 of the video camera 230 into the connector 236 establishes connections allowing the detachable camera 230 to be powered from a power supply within the main body 200, rather than from its own batteries. These connections can be such as to permit recharging of the batteries of the detachable camera 230 providing those batteries are of a type that can be recharged. Preferably there are arrangements for automatically discontinuing the supply of power to the modulator 40 when the video camera 230 is attached to the main body 200.

FIG. 11 shows the video camera 230 with the plug 232 on its back and a receptacle type of connector 236 in the rear wall of the camera cage 202. This reduces the possibility of shock to a person reaching into the back of the cage when the camera 230 is withdrawn from the camera cage 202, but the exposed plug 232 on the back of the camera 230 is susceptible to damage by being banged into things. In alternative designs the video camera 230 has a receptacle type of connector in its back and a plug on the rear wall of the camera cage 202 with a switch sensing the withdrawal of the camera 230 from the camera cage 202 to discontinue application of electrical signals to the plug. In still other designs the camera 230 has the plug 232 recessed into its back and the receptacle type of connector 236 protrudes from the rear wall of the camera cage 202 to receive the plug 232 when the camera 230 is installed within the camera cage 202. Recessing the connector into the back of the camera 230 also facilitates its including both male and female elements, if so desired.

Figure 13:
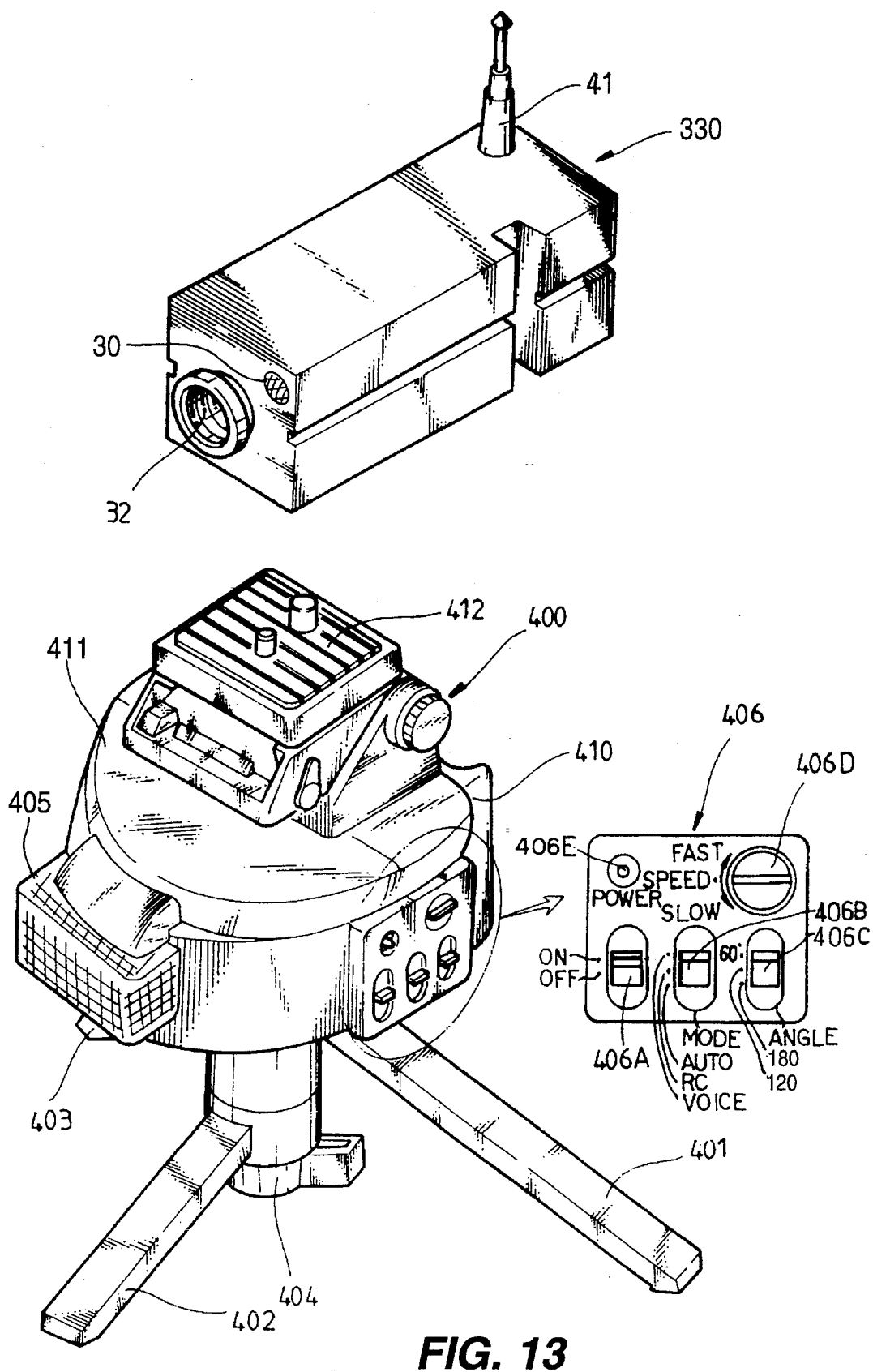
FIG. 13 is a perspective view showing a wireless video camera and a wireless video camera driving device therefor, in accordance with yet another aspect of the invention.

FIG. 13 is a perspective view of a wireless video camera driving device, which embodies an aspect of the invention, together with a wireless satellite video camera 330 that includes the circuits shown in FIG. 4. The wireless video camera 330 is mounted on a tripod 400 which has three support legs 401,402 and 403 and has a main body 410 rotatable respective to those support legs, the main body 410 rotating around a central axis column 404 to which the legs 401,402 and 403 are affixed. The wireless video camera 330 is affixed to a mounting plate 412 which mounting plate 412 connects to the main body 410 to permit adjustment of its tilt and the tilt of the camera angle of the video camera 330 affixed thereon. The wireless video camera 330 as so affixed will rotate together with the main body 410 whenever it rotates.

The main body 410 of the FIG. 13 wireless video camera driving device is provided with a sound source detector 405 for detecting the direction from which a sound emanates and a control panel 406. The sound source detector 405 can simply comprise a pair of oppositely directed unidirectional microphones and means for comparing the respective strengths of their responses for indicating a desired direction of main body 410 rotation. The control panel 406 has thereon a power button 406A for turning on/off the power, a mode button 406B for setting an operating mode, an angle setting button 406C for setting a rotation direction, a rotation speed button 406D for setting a rotation speed, and a lamp 406E for indicating the condition of power button 406A. The rotation of the main body 410 respective to the tripod support legs 401, 402 and 403 is controlled from the operating control panel 406 or from a remote controller (not shown). The main body 410 can be rotated automatically by the detection of a sound source. A portion of the main body 410 of the FIG. 13 wireless video camera driving device is semitransparent for light supplied to a sensor portion of a light receiver 411. The light receiver 411 is used for receiving key signals from the remote controller.

Alternatively, rather than simply affixing the video camera 330 to the mounting plate 412, a cage assembly may be provided for receiving and holding the video camera 330. Equipped with a camera attaching/detaching device similar to that shown in FIG. 11, such cage assembly provides for faster attaching and detaching of the video camera 330. Although no structure for vertically tilting the video camera 330 is shown in FIG. 13, this feature should be considered to be within the scope of the invention. The main body 410 of a modified FIG. 13 wireless video camera driving device that is an alternative embodiment of this aspect of the invention includes a tilt motor for such up and down movement.

Figure 14:
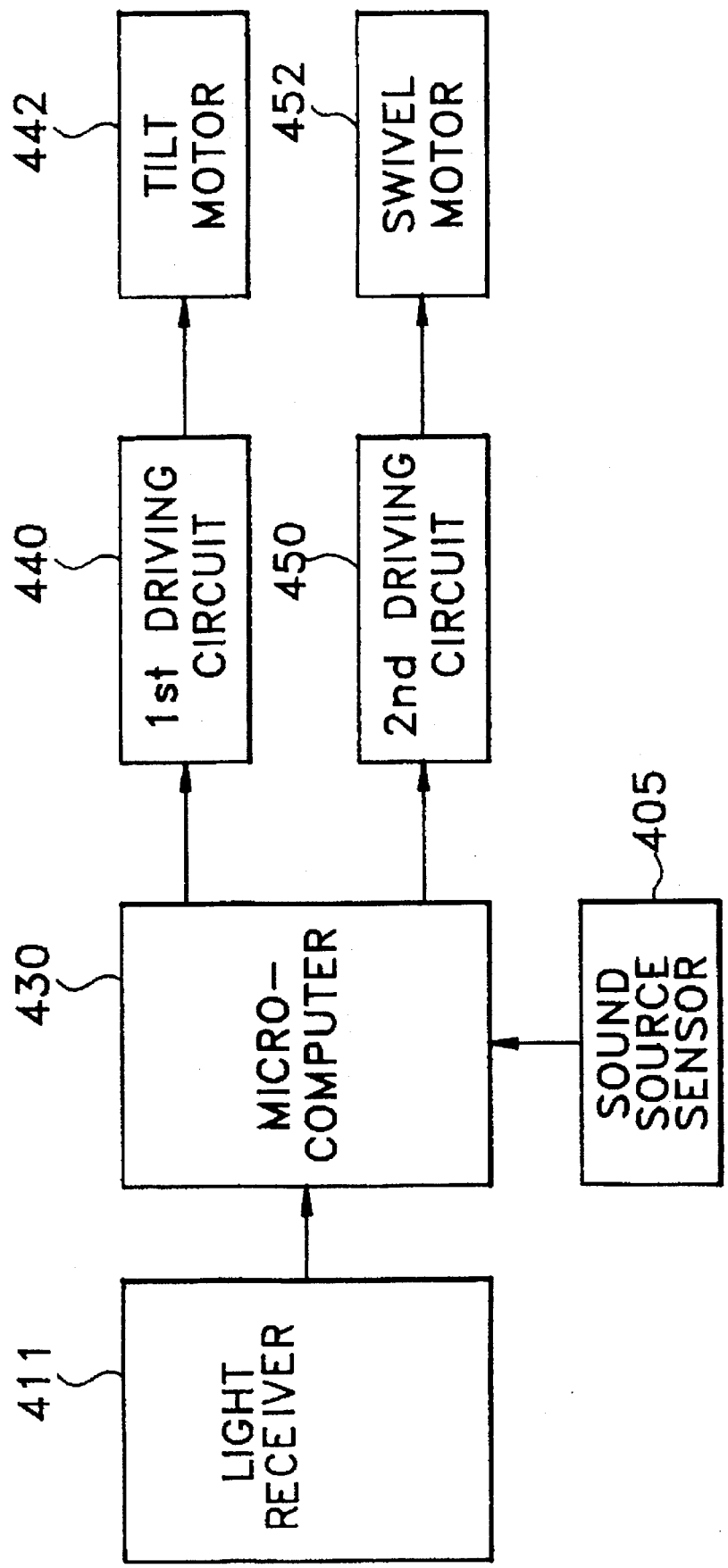
FIG. 14 is a block diagram showing the internal electrical circuitry of the wireless satellite video camera shown in FIG. 13.

FIG. 14 is a block diagram of the circuitry for a FIG. 13 wireless video camera driving device, as modified to include the tilt motor for vertically tilting the video camera 330. The light receiver 411 receives key signals transmitted from a remote controller (not shown, which can per custom transmit in the infrared spectrum) and provides indication that such reception has been detected to a microcomputer 430. In addition, a sound source sensor 405 senses the direction of a sound source generated from an object to be photographed and provides the result to the microcomputer 430.

In the operation of the circuit of FIG. 14, the microcomputer 430 receives a remote-controller key signal from the light receiver 411 or receives an indication of the direction of a sound source signal from the sound source sensor 405 and determines whether to operate the main body 410 in a remote-control mode or in a sound-source-sensing mode. In the remote control mode the microcomputer 430 generates driving control signals for tilting the main body 410 up, for tilting the main body 410 down, for rotating the main body 410 to the left, or for rotating the main body 410 to the right, according to respective key signals selected by the user. In the sound-source-sensing mode the microcomputer 430 generates driving control signals only for rotating the main body 410 to the left or -for rotating the main body 410 to the right. In the remote-control mode, the microcomputer 430 supplies a driving control signal to first and second driving circuits 440 and 450, so that a tilt motor 442 and a swivel motor 452 can be operated. The tilt motor 442 swings the video camera 330 up and down, and the swivel motor 452 swivels the video camera 330 left and right. The main body 410 is preferably equipped with an angle resolver for generating digital signals indicative of the degree of its rotation, for feeding back to the microcomputer 430 to implement a swivel servomechanism; and the tilt mechanism is preferably equipped with another angle resolver for generating digital feedback signals indicative of the degree of video camera tilt, for feeding back to the microcomputer 430 to implement a tilt servomechanism. Accordingly, in the remote-control mode, the tilt motor 442 and the swivel motor 452 can be operated in accordance with the control of a user. In the sound-source-sensing mode, only the swivel motor 452 is driven, to swivel the video camera 330 to the left or to the right.

Figure 15:
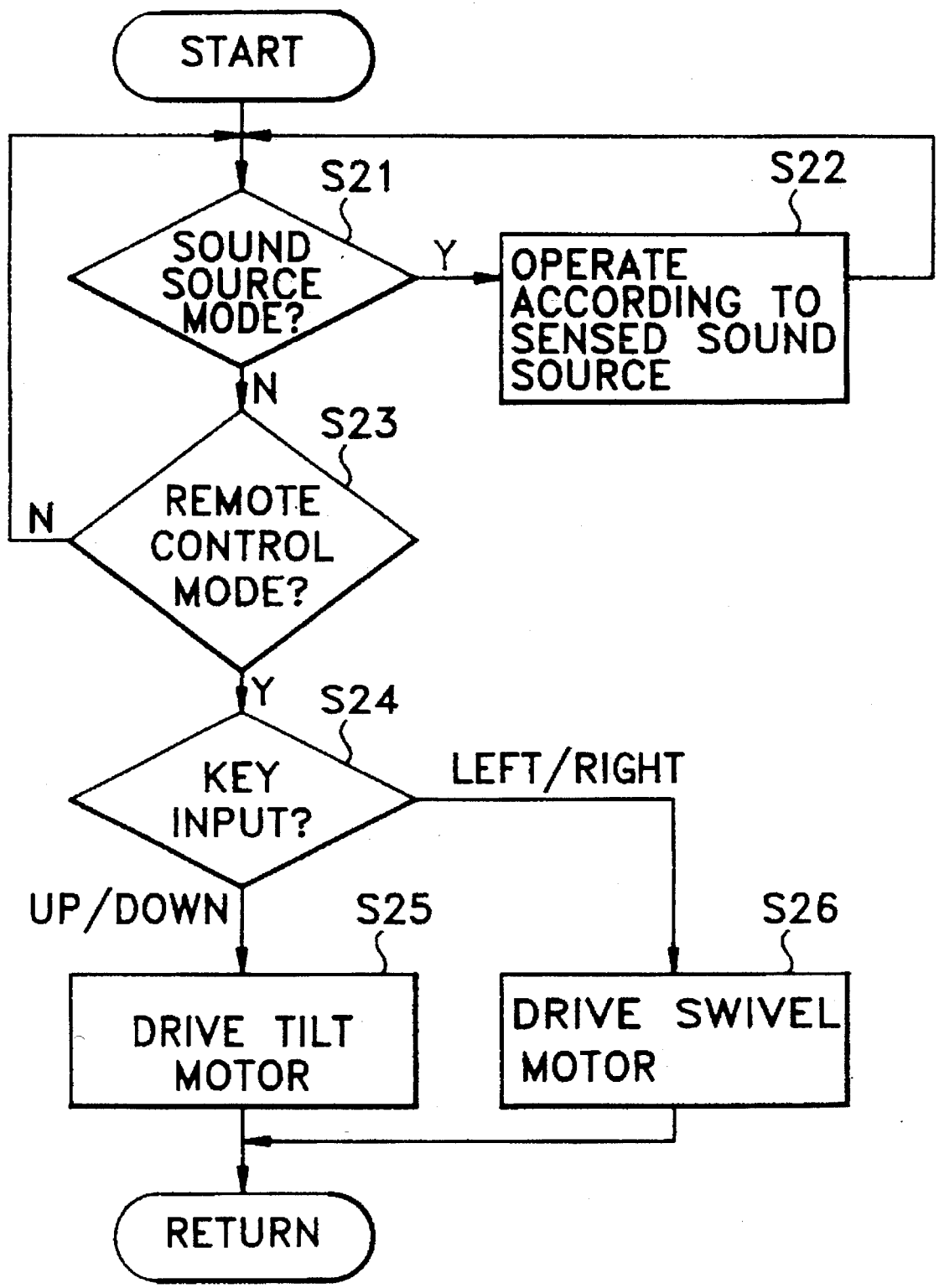
FIG. 15 is a flowchart diagram showing a method for driving the wireless satellite video camera shown in FIG. 13.

FIG. 15 is a flowchart for operation of a wireless video camera in accordance with an aspect of the invention, which flowchart will be explained with reference to FIG. 14.

Referring to FIG. 15, when a power is applied, the microcomputer 430 discriminates whether the current mode is a remote-control mode or a sound-source-sensing mode (steps S21 and S23). In case of sound-source-sensing mode, the microcomputer 430 responds to a sound source signal from the sound source sensor 405, thereby driving the swivel motor 452 (step S22).

The swivel motor 452 is controlled so as to promptly move a camera in a direction where a sound source is generated according to the signal sensed by the sound source sensor 405. In addition, when the lens 32 of the wireless video camera 330 is directed to the place where a sound source is generated, the microcomputer 430 stops the rotation of the swivel motor 452. Accordingly, the swivel motor is driven so as to direct the camera toward the place where a sound source is generated. Thus, the object can be photographed correctly.

On the other hand, in the remote-control mode (the "RC" setting of mode button 406B of the control panel 406), the microcomputer 430 determines whether a key signal is received from a remote controller (step S24). If the control signal input from the remote controller is for up or down movement of the video camera, the microcomputer 430 supplies a driving control signal to the first driving circuit 440 to drive the tilt motor 442 (step S25).

Meanwhile, if a key signal received from the remote controller is a swivel motor control signal for controlling left or right movement of the video camera, the microcomputer 430 supplies a driving control signal to a second driving circuit 450, to drive the swivel motor 452 (step S26). Accordingly, an object at a given position can be photographed under user control.

As described above, in accordance with an aspect of the invention, a detachable wireless camera is separated from a magnetic recording/reproducing apparatus and placed on a tripod constructed as a wireless video camera driving apparatus, in accordance with a further aspect of the invention. Then, the wireless video camera driving apparatus swivels the video camera (and tilts it, where tilting is provided)in response to a remote controller or a sound source sensor in accordance with still other aspects of the invention, to thereby easily photograph the desired object. As mentioned above another embodiment of this aspect of the invention is one in which the video camera is attached to a swivel plate on top of the main body of the magnetic recording/reproducing apparatus rather than on a tripod; in such arrangement the wireless link between the video camera and the main body avoids the restraints upon swiveling imposed by connecting wires.

In accordance with yet another aspect of the invention to be described directly hereafter, a camera is provided in a magnetic recording/reproducing apparatus; and a location of the object to be photographed is programmed in a microcomputer. Thus, by inputting a code allocated in accordance with a location of the object, the camera can be automatically swiveled (and in some designs tilted) to point in a direction where the object is placed, which can be explained with reference to FIGS. 16, 17 and 18. The explanation will be with specific reference to magnetic recording/reproducing apparatus with a built-in video camera of the general sort shown in FIGS. 1 and 6, but in which the camera is capable of being swiveled by a swivel motor. In a variant of the apparatus per FIG. 1 or 6, the main body 1 or 100 rests on a turntable, which permits the main body to be rotated by a swivel motor. The control of a wireless satellite video camera can be done by similar methods.

Figure 16:
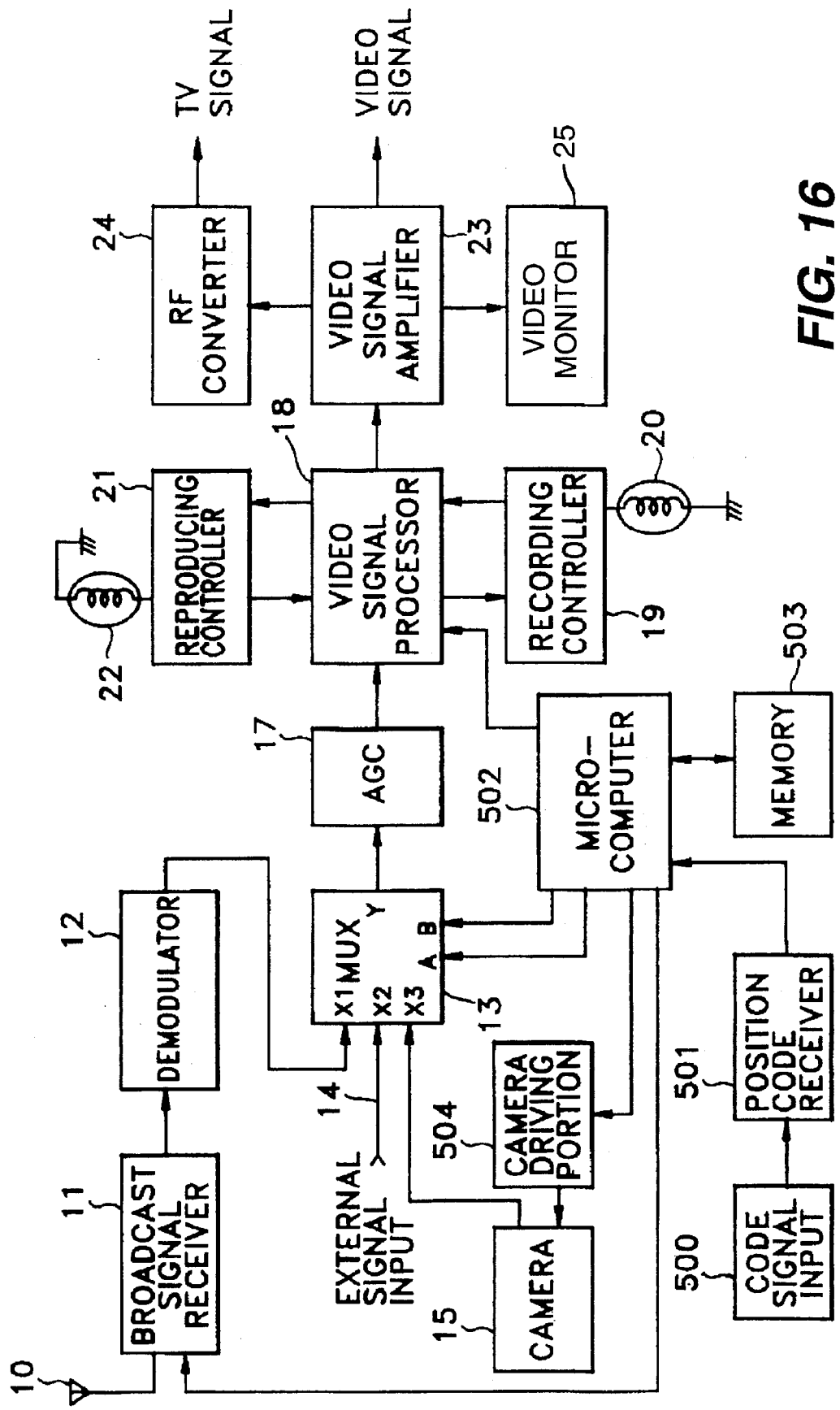
FIG. 16 is a block diagram of circuitry for magnetic recording/reproducing apparatus, as constructed to have the video camera associated therewith pointed in accordance with a code signal input, according to yet a further embodiment of the invention.

Referring to FIG. 16, which is a block diagram of circuitry for magnetic recording/reproducing apparatus having the video camera associated therewith pointed in accordance with a code signal input, the same reference numerals as those of FIG. 2 denote similar components that operate similarly and will not be described again in the following detailed explanation.

Referring to FIG. 16, a code signal input device 500 is connected to a position code receiver 501 to supply it a position code descriptive of the location of an object to be photographed. Position code receiver 501 reads the input code, which typically is the same binary-coded digit repeated over and over many times, and converts it to a signal recognizable by a microcomputer 502 to which the converted code is supplied. The conversion process parses the cyclical repeating of the input code and converts the redundant repetition of the binary-coded digit to a position code consisting of the binary-coded digit. The code signal is predetermined to correspond to the location of an object to be photographed. A memory 503 for writing and reading the swivel rotation angle and the tilt angle of the video camera 15 corresponding to the position code is connected to the microcomputer 502. The microcomputer 502 reads, from the memory 503, data concerning a rotation angle corresponding to a position code input from position code receiver 501 and supplies a driving control signal to the camera driver 504 according to the read value. The video camera 15, being connected to the camera driver 504, is driven according to an output signal of the camera driver 504.

To perform such an operation, a code corresponding to the position of the object to be photographed and the swivel angle and the tilt angle corresponding to the code is pre-stored in the memory 503 in accordance with Table 2.

TABLE 2

| position code | camera rotation angle | |
|---|---|---|
| | left/right | up/down |
| A  000 | a1 | a2 |
| B  001 | b1 | b2 |
| C  011 | c1 | c2 |
| D  111 | d1 | d2 |

Referring to Table 2, when the camera combined with the magnetic recording/reproducing apparatus can be moved up, down, left and right, arbitrary codes A, B, C and D are designated according to each predetermined location, and the code key according to the location can be established by the code signal input device 500. Also, a respective binary-coded digit is assigned for each arbitrary code and is supplied to the microcomputer 502 by the position code receiver 501 to address a location in the memory 503. For the sake of simplicity the memory 503 will be described as if it were a random access type directly addressed by the position code. The memory 503 used with the microcomputer 502 generally is one sequentially addressed by the microcomputer 502, however, with the position code entered as data together with a corresponding rotation angle. The microcomputer 502 in such case scans the contents of the memory 503 until a binary-coded digit position code is reached corresponding to that furnished by the position code receiver 501 to the microcomputer 502, and then rotational data accompanying the stored binary-coded digit position code is then confirmed as a result for further calculation. Thus, the microcomputer 502 reads from the memory 503 the swivel and tilt rotation angles established for each predetermined location and supplies the camera driver 504 with a driving control signal corresponding to the read rotation angle.

The binary-coded digits transmitted to the position code receiver 501 by the code signal input device 500 are selected so that a string of them can be distinguished by the microcomputer 502 from a string of each and every other one of them. A string 000 000 000 etc. of the digit 000 is distinguishable by having all ZEROs and no ONEs. A string 001 001 001 etc. of the digit 001 is distinguished by alternating pairs of ZEROs with ONEs if 010 and 100 are excluded as position codes or are considered the same position code as 001. A string 011 011 011 etc. of the digit 011 is distinguished by alternating pairs of ONEs with ZEROs if 101 and 110 are excluded as position codes or are considered the same position code as 011. A string 111 111 111 etc. of the digit 111 is distinguishable by having all ONEs and no ZEROs. The position code receiver 501 can recode the binary-coded digits to binary digits to reduce the number of bits required for storing the position code in the memory 503, recoding 000 to 00, recoding 001 to 01, recoding 011 to 10 and recoding 111 to 11, for example, which procedure is preferred by the inventors.

The predetermination of camera angles and the writing of the memory 503 can be done by providing graduation marks on the camera swivel mechanism and on the camera tilt mechanism that can be read by the user, and by further providing means for the user writing suitable locations in the memory 503 via the code signal input device 500, the position code receiver 501, and the microcomputer 502. The predetermination of camera angles and the writing of the memory 503 is facilitated, however, by equipping the camera swivel mechanism with an angle resolver for generating digital signals indicative of the degrees of camera swivel, for application to the microcomputer 430. If the video camera has a camera tilt mechanism, it also can be equipped with an angle resolver for generating digital signals indicative of the degrees of camera tilt, for application to the microcomputer 430. If the camera swivel mechanism and to the camera tilt mechanism are constructed as feedback servomechanisms receiving final camera swivel and tilt positions as their driving control signals, the angle resolvers will be used in any case for supplying feedback signals for comparison with the final camera swivel and tilt positions to develop error signals. In an initial set-up procedure, the camera is swiveled and tilted to each of the desired camera angles. This can be done responsive to controls on the wireless video camera driving device or on the remote controller. A television receiver or a monitor on the magnetic recording/reproducing apparatus is used to preview the result. When each successive camera position is optimized to the satisfaction of the user, he actuates a control instructing the microcomputer 430 to write to the memory 503 the digital signals the microcomputer 430 receives from the swivel and tilt angle resolvers, at the same time depressing one of the A, B, C and D code keys for transmitting the address for the location in the memory 503 where the swivel and tilt coordinates are to be stored. Alternatively, the initial set-up procedure can be performed, without need for a television receiver or a monitor on the magnetic recording/reproducing apparatus, by relying on sound-source-sensing to select camera angles, with the control instructing the microcomputer 430 to write to the memory 503 the digital signals the microcomputer 430 receives from the swivel and tilt angle resolvers being actuated after each camera angle is found.

FIG. 16 shows a connection from the microcomputer 502 to the broadcast signal receiver 11; this connection is used for the microcomputer 502 to transmit commands to the broadcast signal receiver 11 for turning its power on at selected times and for turning its power off at selected times, depending on the mode in which the FIG. 16 circuitry is operated. There is a similar connection from a microcomputer 604 to the broadcast signal receiver 11 in the FIG. 19 circuitry that will be described further on in this specification.

Figure 17:
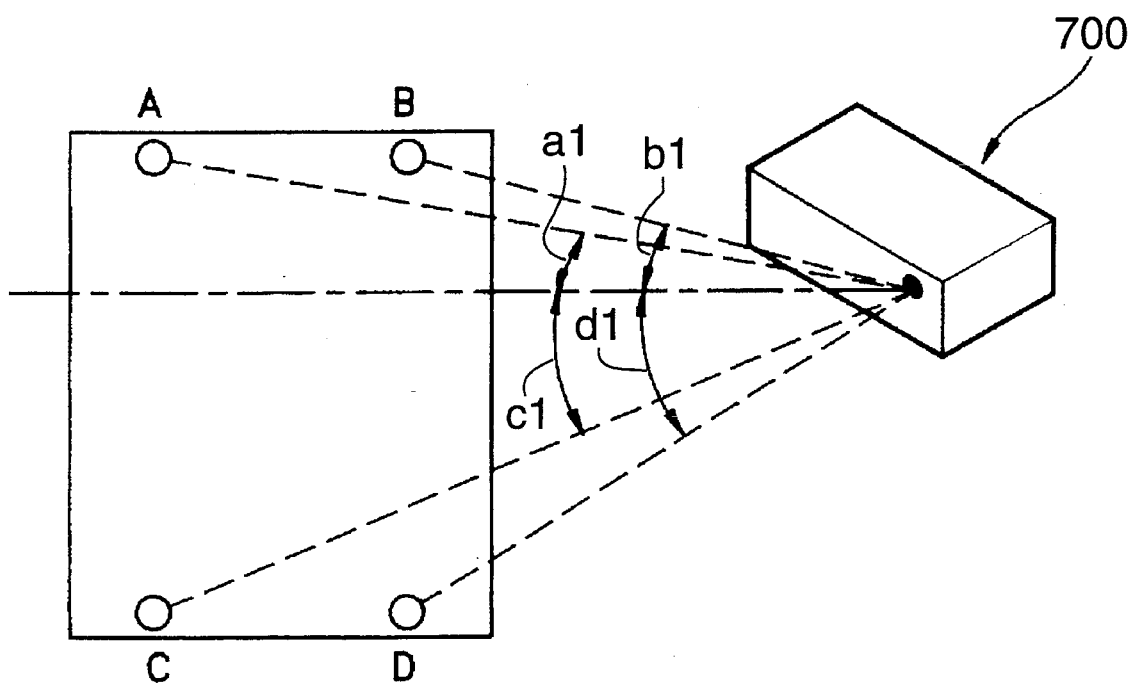
FIG. 17 is a view for illustrating rotation angles according to an object position code supplied to the FIG. 16 magnetic recording/reproducing apparatus.

FIG. 17 illustrates the establishment of a left and right rotation angle of a video camera within the main body 700 of a magnetic recording/reproducing apparatus, when the video camera can only be swiveled or rotated left and right. That is, the left and right rotation angle at point A is a1, and the left and fight rotation angle of point D is d1. The various values a2, b2, c2, d2 of camera rotation angle in Table 2 refer to tilt or an up and down rotation angle which can be established if the camera is enabled to move up and down. That is, as described above, a code value for each predetermined position of Table 2 is prestored in the memory 503 by a user, and a key (not shown) of code signal input device 500 of FIG. 16 is controlled by employing a camera-integrated magnetic recording/reproducing apparatus, thereby to enable photographing of the desired position.

A more detailed explanation with reference to FIG. 17 is as follows. When a user pushes a key B among predetermined keys (not shown) of the code signal input device 500, a key signal corresponding thereto is received at the position code receiver 501. Then, as a binary-coded digit code value, 001, is supplied to the microcomputer 502. Accordingly, the microcomputer 502 reads out a swivel angle from the memory 503 corresponding to 001. Here, the swivel angle is b1 of FIG. 17, and a driving control signal corresponding to the rotation angle is supplied to the camera driver 504. As a result, the video camera 15 is swiveled to the desired direction for photographing. The selection of camera angle can be determined by one person or by a number of persons passing the remote controller amongst themselves. Or each of the persons at a meeting can be supplied a simple remote control that directs the video camera towards him.

Figure 18:
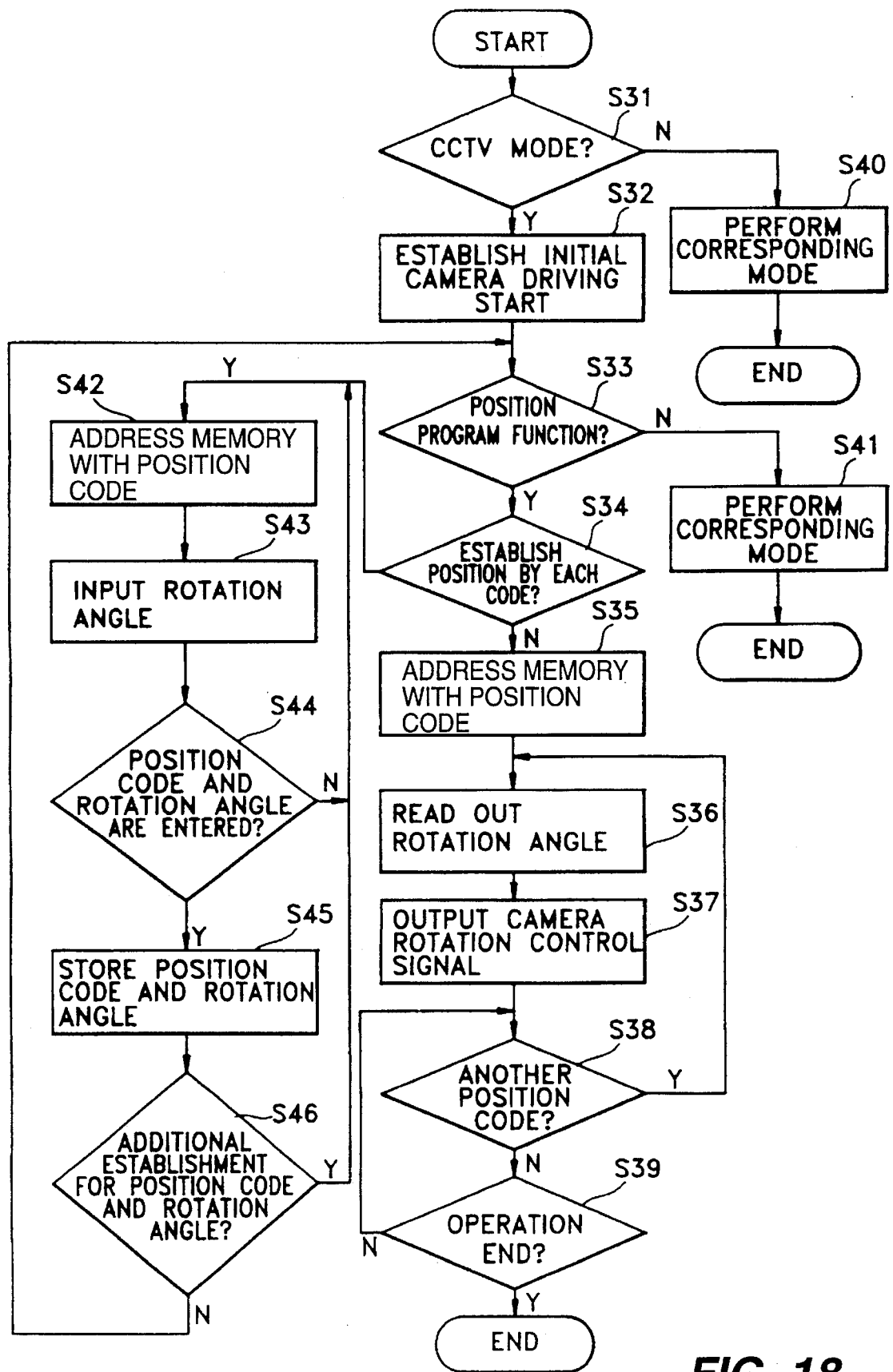
FIG. 18 is a flowchart diagram showing an object photographing method which is performed in the FIG. 16 microcomputer.

Such operation will be explained in more detail with reference to the flowchart of FIG. 18. First, the microcomputer 502 determines whether the current mode is a closed circuit television (CCTV) mode (step S31), and if not, performs a corresponding mode (step S40). If the current mode is determined to be a CCTV mode, the camera initial driving state is established (step S32). Then, it is determined whether a position program function is to be performed (step S33), and if such function is not to be carried out, a corresponding function is carried out (step S41). The functions that can be carried out in step S41 include tilt camera up, tilt camera down, swivel camera left and swivel camera right functions carried out under direct control of the user and can further include unattended functions such as various patterns of camera sweep for surveillance purposes. The determination of the corresponding function to be carried out is made according to key-signal input by the user other than any of the A, B, C and D key-signal inputs, which other key-signal input is basis for determining in step S33 that a position program function is not to be performed.

When an A, B, C or D key-signal input is furnished, this is basis for determining in step S33 that a position program function is to be performed. The microcomputer 502 then decides whether the rotation angle stored in the memory for the associated position code is to be revised or used for rotating the position of the camera to a rotation angle previously stored in the memory 503 (step S34). This decision is based on the present condition of a front panel control switch or by a previous key-signal input that instructed the microcomputer 502 to store the decision that in step S34 the rotation angle stored in the memory for the associated position code is to be revised.

When the position described by each position code is known and is not to be established anew, the microcomputer 502 addresses the memory 503 with the binary-coded digit code it receives from the position code receiver 501 (step S35). This binary-coded digit code, repeatedly supplied as position code to the position code receiver 501 from the code signal input device 500, corresponds to one of the key-signal codes A, B, C or D indicating the predetermined positions of subjects to be photographed. A rotation angle stored in the memory 503 at a location addressable by the binary-coded digit is read out to the microcomputer 502 (step S36). Then, a driving control signal in accordance with the read rotation angle is supplied from the microcomputer 502 to the camera driver 504 (step S37). That is, if the input position code is C, the rotation angle (considering left/right movement only) corresponding to the position code stored in the read memory is c1. Accordingly, in step S37, the microcomputer 502 supplies a driving control signal for driving the video camera 15 so as to point in the c1 direction of FIG. 17. The microcomputer 502 then supplies a camera driving control signal according to the input position code and then determines if there is a position code input for photographing another object (step S38), and if so, the program loops back to step S36. At this time, if another position code A is received, rotation angle a1 corresponding thereto is read out in step S36, and the current rotation angle is combined with the read rotation angle. E.g, the microcomputer 502 supplies a driving control signal so as to swivel the camera by a rotation angle of −c1+a1. In step S38, if there is no other position code input, the microcomputer 502 confirms the end of the operation. If it is not the end, step S38 is repeated. However, if it is the end, the operation stops (step S39).

When the position described by one or more of the position codes is to be established anew, the microcomputer 502 addresses the memory 503 with the binary-coded digit code it receives from the position code receiver 501 (step S42). This binary-coded digit code, repeatedly supplied as position code to the position code receiver 501 from the code signal input device 500, corresponds to one of the key-signal codes A, B, C or D indicating that that key-signal code is to be associated with a new camera angle. Then the revised rotation angle for corresponding to the position code is written to the memory 503 by the microcomputer 502 (step S43). In other words, the user inputs a key-signal code that can arbitrarily correspond to any revised rotation angle. Therefore, arbitrary code values such as A, B, C and D of Table 2 determine position codes, which in step S42 are input to the memory 503 as write addressing. In addition, the camera rotation angle, i.e., the desired direction for photographing, is written into the memory 503 in step S43. Here, the rotation angle is such value as a1, b1, c1 and d1 of Table 2. The thus-input position code and rotation angle corresponding to the position code are stored in a temporary data storage register (generally a buffer which is not shown) of the microcomputer 502. In addition, the microcomputer 502 confirms the memory key operated by a user in step S44 and stores into memory 503 the position code stored in the temporary data storage register and the rotation angle corresponding to the position code (step S45), or the operation returns to step S42. In addition, the microcomputer 502 confirms the additional code key so as to determine in step S46 whether or not a position code and rotation angle additionally need to be established. If an additional establishment of rotation angles is needed, steps S42 to S46 are sequentially performed again, and if an additional establishment is not needed, the operation returns to step S33. At the same time, if the microcomputer 502 was previously instructed to store the decision that in step S34 the rotation angle stored in the memory for the associated position code is to be revised, the microcomputer 502 is instructed to store instead the decision that in step S34 the rotation angle stored in the memory for the associated position code is to be used for rotating the position of the camera to a rotation angle previously stored in the memory 503.

Accordingly, when a magnetic recording/reproducing apparatus with an adjustably positioned built-in video camera is employed, a user establishes beforehand a position of the object to be photographed and controls keys according to the predetermined positions during operation of the apparatus, which subsequently facilitates rapid selection of camera angles. Installation and set-up costs for a meeting or conference can be remarkably reduced.

Figure 19:
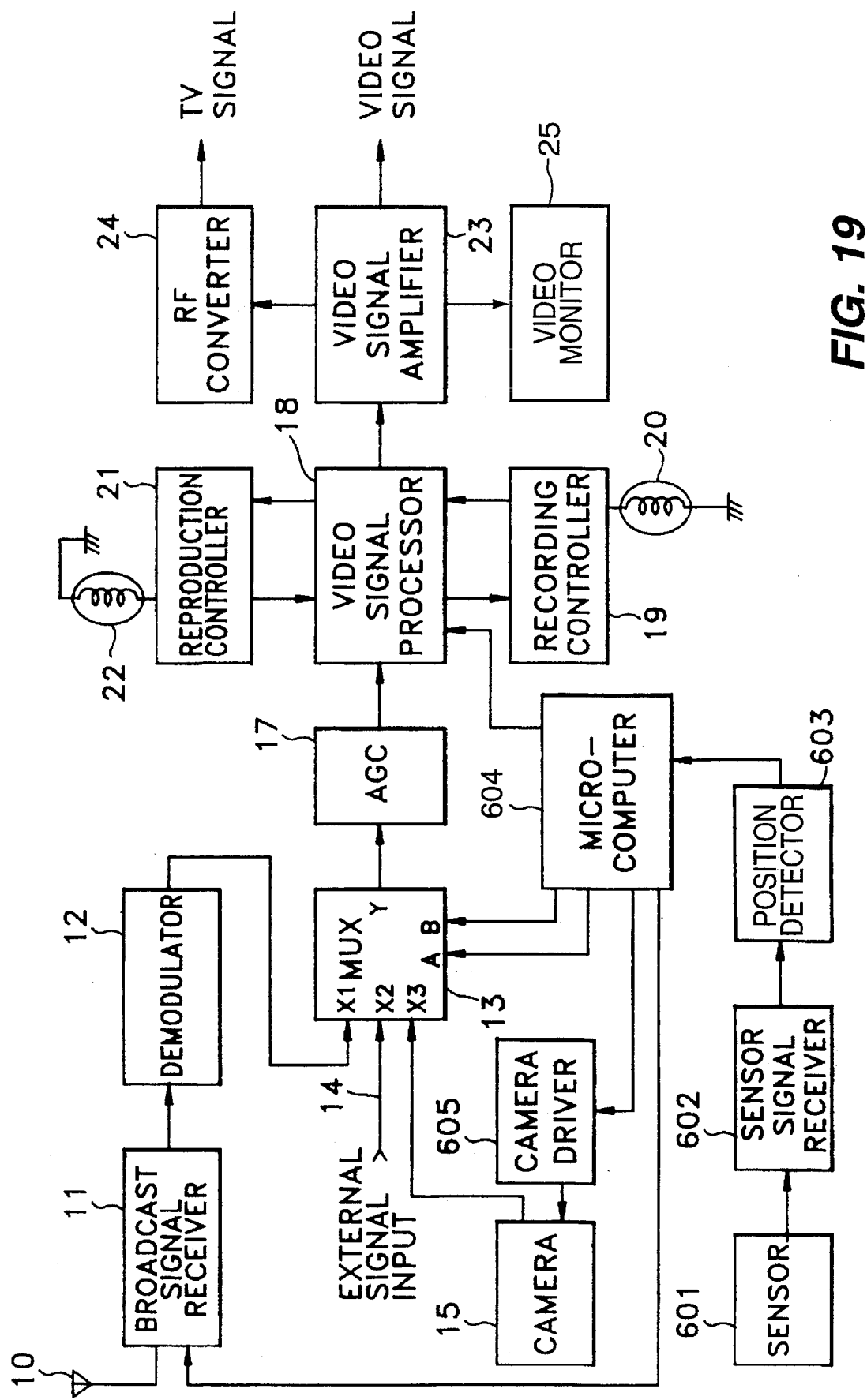
FIG. 19 is a block diagram of circuitry for magnetic recording/reproducing apparatus, as constructed to have the video camera associated therewith pointed towards a source of sound by a sound-source-sensing device in accordance with an aspect of the invention.

FIG. 19 is a block diagram showing circuitry for a magnetic recording/reproducing apparatus with an adjustably positioned built-in video camera having a sound-source-sensing function for aiming the camera in accordance with an aspect of the invention. The apparatus shown in FIG. 19 and FIG. 20 performs function similar to that of the apparatus of FIGS. 13, 14 and 15. The same reference numerals of FIG. 19 as those of FIGS. 2 and 16 denote like components. Therefore, detailed explanation of those components will be omitted.

Referring to FIG. 19, a camera-integrated magnetic recording/reproducing apparatus comprises a sensor 601 for sensing a sound source, a sensing signal receiver 602, a position detector 603 for detecting a position of the sound source from the received sensing signal, a microcomputer 604 for calculating a camera rotation angle corresponding to the detected position and outputting a driving control signal and a camera driver 605 for rotating the video camera 15 in a direction of the sound source according to the driving control signal.

In one embodiment of the FIG. 19 apparatus the sensor 601 is provided in the main body of the magnetic recording/reproducing apparatus, with a plurality of unidirectional microphones being used. For example, in order to detect the direction of sound emanating from an object to be photographed so as to be able to adjust both the swivel and the tilt of the video camera, four unidirectional microphones are provided in the main body of the magnetic recording/reproducing apparatus for detecting sounds emanating from above, from below, from the right and from the left, respectively. Then, the strength values of the microphone responses are compared so as to output a sensing signal with respect to the direction of the sound source. The sensing signal receiver 602 amplifies sensing signals supplied from the four microphones (up, down, left and right) and detects a level of each amplified signal. The position detector 603 compares levels from the left and fight microphones as supplied from the sensing signal receiver 602, estimates from this comparison the horizontal position of the subject to be photographed, and supplies the estimate to the microcomputer 604. The position detector 603 compares levels from the up and down microphones as supplied from the sensing signal receiving portion 602, estimates from this comparison the vertical position of the subject to be photographed, and supplies the estimate to the microcomputer 604. Using the estimates of the horizontal and vertical positions of the subject to be photographed supplied to it from the position detector 603, the microcomputer 604 calculates the appropriate changes in the swivel and tilt angles of the video camera 15, and generates driving control signals corresponding to the calculation result. These driving control signals are supplied to the camera driver 605 which changes the swivel and tilt angles of the video camera 15 in response to the driving control signals.

In other embodiments of the FIG. 19 apparatus the sensor 601 is outside the main body of the magnetic recording/reproducing apparatus, with each subject to be photographed being provided with a respective microphone. The positions of the microphones are programmed in advance and established in the microcomputer 604 memory, and the video camera is automatically pointed in the direction of a microphone currently being spoken into, so as to photograph the person speaking. The microphones are preferably of wireless type, in which case they must supply distinctive respective sound source identification signals to the sensing signal receiver 602 in the FIG. 19 magnetic recording/reproducing apparatus in order that it can be determined which of the microphones is currently being spoken into.

Where the microphones are wireless types operating with different carrier frequencies, the carrier frequency of the wireless microphone can be its source identification signal. The video camera 15 can be directed to the one of the microphones having the strongest response. The sensing signal receiver 602 receives the modulated carriers from the wireless microphones and detects the various microphone responses. The strength values of these responses are detected in the sensing signal receiver 602, adjusted if necessary to account for differences in the loudness of the speaking voices of the subjects to be photographed, and forwarded to the position detector 603, where the strength values of the adjusted microphone responses are compared. The position detector 603 supplies the microcomputer 604 with the source identification signal of the strongest microphone response, as converted to a digital format acceptable to the microcomputer 604. Responsive to this input the microcomputer 604 calculates any required change in camera angle and supplies driving control signals to the camera driver 605 for implementing such change. The sensing signal receiver 602 supplies the various microphone responses to the recording electronics of the magnetic recording/reproducing apparatus, where they are subjected to automatic gain control and mixing procedures preparatory to recording. The position detector 603 can be made more sophisticated in regard to providing the microcomputer 604 information for determining when camera angle is to be changed—deterring change in camera angle as long as a speaker continues speaking, for example, rather than switching camera position to an interrupting speaker with a loud voice. The use of wireless microphones operating with different carrier frequencies requires separate receivers for each in the sensor signal receiver 602, and there is some complexity in the input selector 13 multiplexer connections.

Figure 20:
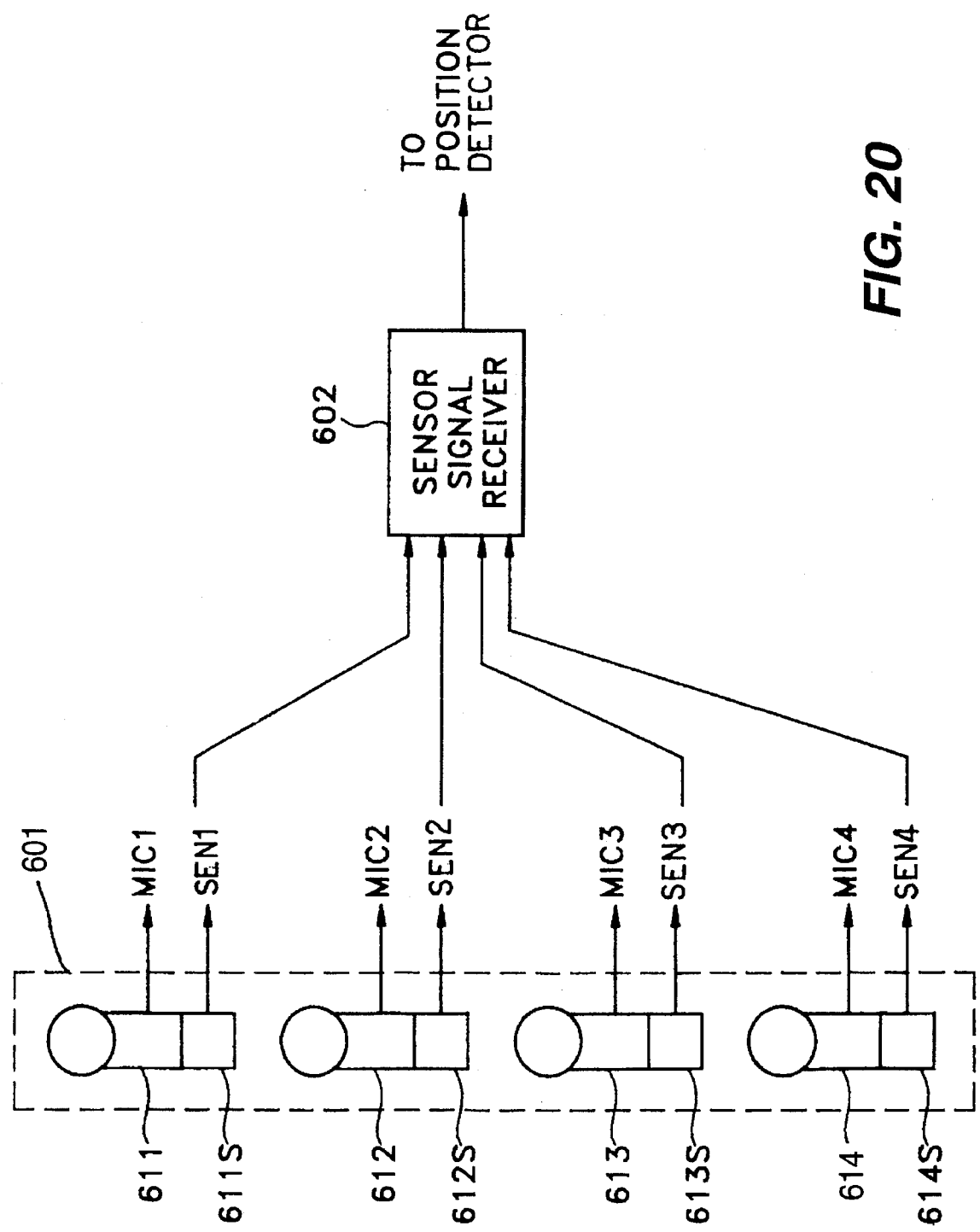
FIG. 20 is a block diagram showing an example of the sound-source-sensing device used in the FI CURE 19 apparatus.

FIG. 20 shows another embodiment of the sensor and sensor signal receiver of FIG. 19, in which each subject to be photographed is provided with a respective wireless microphone. However, the wireless microphones all use the same carrier frequency. This procedure does not readily permit the mixing of responses from the microphones for recording, but is less expensive in a number of respects and works rather well as long as speakers are willing to wait their turn to speak. A particular saving is that the wireless microphones can transmit frequency-modulated carrier directly to the broadcast signal receiver 11, avoiding the need for separate receivers for each of various carrier frequencies in the sensor signal receiver 602, and avoiding the resultant complexity in the input selector 13 multiplexer connections. The wireless microphones 611, 612, 613 and 614 generate microphone responses MIC1, MIC2, MIC3 and MIC4, respectively, which modulate the common carrier frequency in the respective wireless microphones. Since all the wireless microphones 611, 612, 613 and 614 use the same carrier frequency, the carrier frequency used by each cannot serve as its source identification signal. The wireless microphones 611, 612, 613 and 614 contain respective tone generators 611S, 612S, 613S and 614S that combine distinctive respective sound source identification signals with the modulated carrier frequency signals which the wireless microphones 611,612, 613 and 614 transmit to the sensing signal receiver 602 in the FIG. 19 magnetic recording/ reproducing apparatus. Each of the wireless microphones 611, 612, 613and 614 contains circuitry for detecting the strength of its respective microphone response, a threshold detector for detecting when the microphone response is above a threshold level associated with incidental background noise, and a modulator energized only when that microphone response is above the threshold level, which modulator generates the carrier wave as modulated by the microphone response and the tone combined therewith as a distinctive sound source identification signal. The sensing signal receiver 602 separates the accompanying tone from the demodulated microphone response with a selective tone filter that supplies a respective response for each different tone. The strengths of these tones are detected in the sensing signal receiver 602, and the results and forwarded to the position detector 603, where the strength values of tones are compared. The sensing signal receiver 602 supplies the microphone response to the recording electronics of the magnetic recording/reproducing apparatus, where it is subjected to automatic gain control preparatory to recording. The position detector 603 supplies the microcomputer 604 with the source identification signal of the strongest microphone response, as converted to a digital format acceptable to the microcomputer 604. As in the previously described embodiment, the positions of the microphones are programmed in advance and established in the microcomputer 604 memory Responsive to the source identification signal supplied in digital format acceptable to the microcomputer 604, the microcomputer 604 calculates any required change in camera angle and supplies driving control signals to the camera driver 605 for implementing such change.

In a variation of the FIG. 20 sensor arrangement the wireless microphones 611, 612, 613 and 614 are provided with means for selectively activating their respective tone generators 611S, 612S, 613S and 614S by means alternative to or in addition to the microphone responses MIC1, MIC2, MIC3 and MIC4 exceeding a specific strength. This allows the camera angle to be shifted without need for the subject being photographed having to speak.

One particularly elegant way to transmit the sound source identification signals when using the FIG. 20 sensor arrangement or a variant thereof in which the wireless microphones 611, 612, 613 and 614 transmit frequency-modulated audio carrier directly to the broadcast signal receiver 11 is to place a respective ultrasonic subcarrier tone in the stereophonic subcarrier region of the transmitted audio carrier for providing each sound source identification signal. The sensor signal receiver 602 can then recover the sound source identification signals from the FM sound detector of the broadcast signal receiver 11. Since the wireless microphones transmit no stereophonic pilot subcarrier, the stereophonic decoder in the broadcast signal receiver 11 is conditioned not to respond to the sound source identification signals, so their presence does not interfere with reception of the transmitted microphone response.

Figure 21:
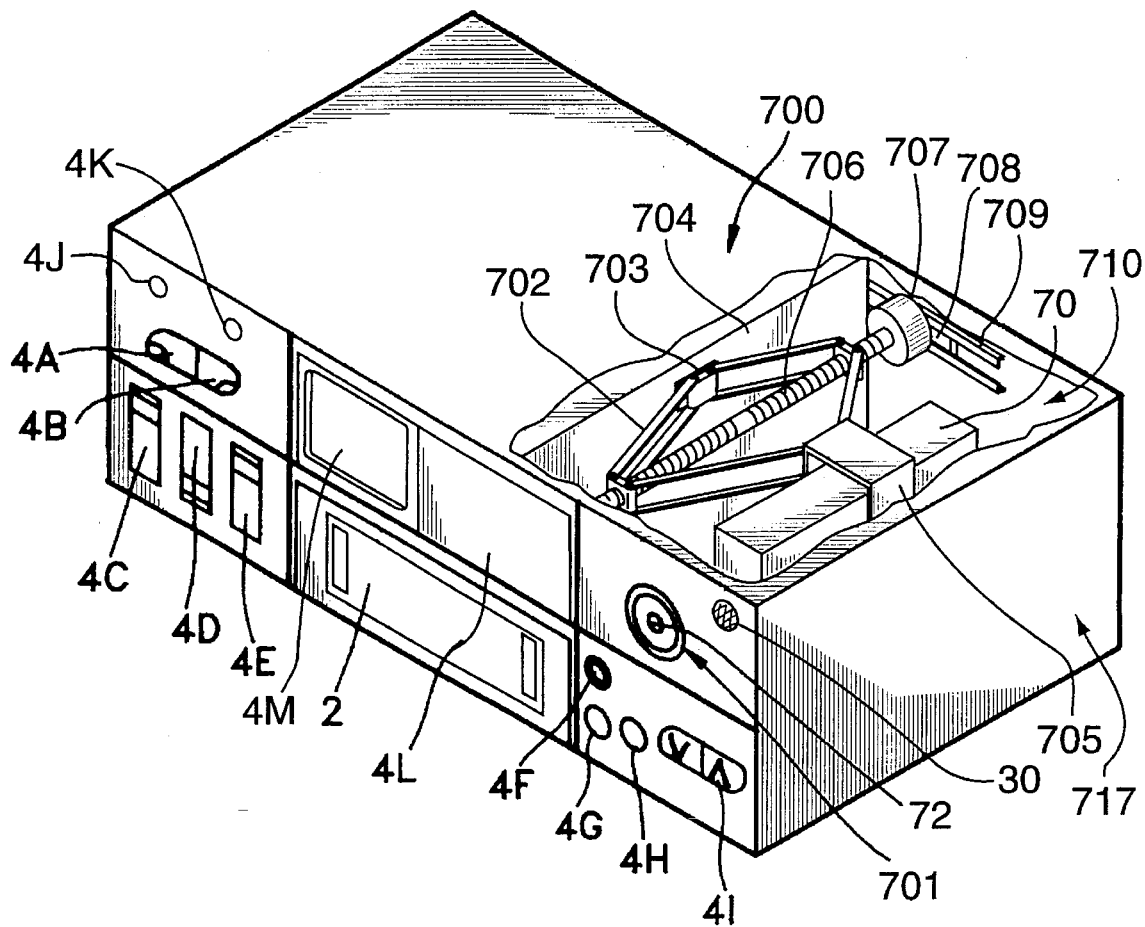
FIG. 21 is a perspective view of magnetic recording/reproducing apparatus constructed to have the video camera associated therewith swiveled left or right, the top of which recording/reproducing apparatus is cut away to reveal the swivel mechanism.

FIG. 21 shows representative apparatus for swiveling a video camera 70 within the main body 700 of a magnetic recording/reproducing apparatus, the top cover of the main body 700 being cut away to reveal the swivel mechanism. To make room for the swivel mechanism, the cassette tape player mechanism is placed near the floor of the main body 700. Accordingly, the door 2 for insertion of a cassette tape (not shown) is located lower on the front panel of the main body 700 than on the front panel of the main body 1 of FIG. 1; and the control panel 4L and the video monitor 4M screen are located higher on the front panel, the control components extending not as far into the main body 700 as the cassette tape player mechanism. A lens 72 of the video camera 70 is held in the front panel by gimbals 701 so as to permit swiveling and tilting of the video camera 70. The gimbals 701 are sturdily made so as to support part of the weight of the video camera 70 and to resist thrust resulting from the operation of the camera swiveling and tilting mechanisms. A scissors frame 702 connects at one corner thereof to a pivot assembly 703 attached to an interior partition wall 704 of the main body 700 and connects at the opposing corner thereof to a pivot assembly 711 hinged to a Teflon brand plastic yoke 705 that surrounds the video camera 70. The pivot assembly 711 is hidden from view behind the video camera 70 in FIG. 21, but can be seen in FIG. 22. The other front and rear corners of the scissors frame 702 contain respective captive nuts with a left-hand interior threading and with a right-hand interior threading, respectively, for receiving a lead screw 706 having left-hand exterior threading on its front portion and having right-hand exterior threading on its rear portion which lead screw 706 by its rotation extends and collapses the scissors frame 702. This lead screw 706 is on the motorshaft of a swivel motor 707 mounted on a shoe 708 that slides in a horizontal trackway 709 mounted on the back panel 710 of the main body 700. The yoke 705 hugs the sides of the camera 15, which are jacketed with Teflon brand plastic, so as to control the camera swivel angle. As the scissors frame 702 extends towards full length between pivot 703 and the pivot attached to the yoke 705, the video camera 70 is swiveled to the right; as the scissors frame 702 is reduced in length between pivot 703 and the pivot attached to the yoke 705, the video camera 70 is swiveled to the left. The yoke 705 has sufficient up and down clearance from the camera 70 not to restrain its tilt, and their Teflon brand plastic surfaces are substantially free of sliding friction between them.

Figure 22:
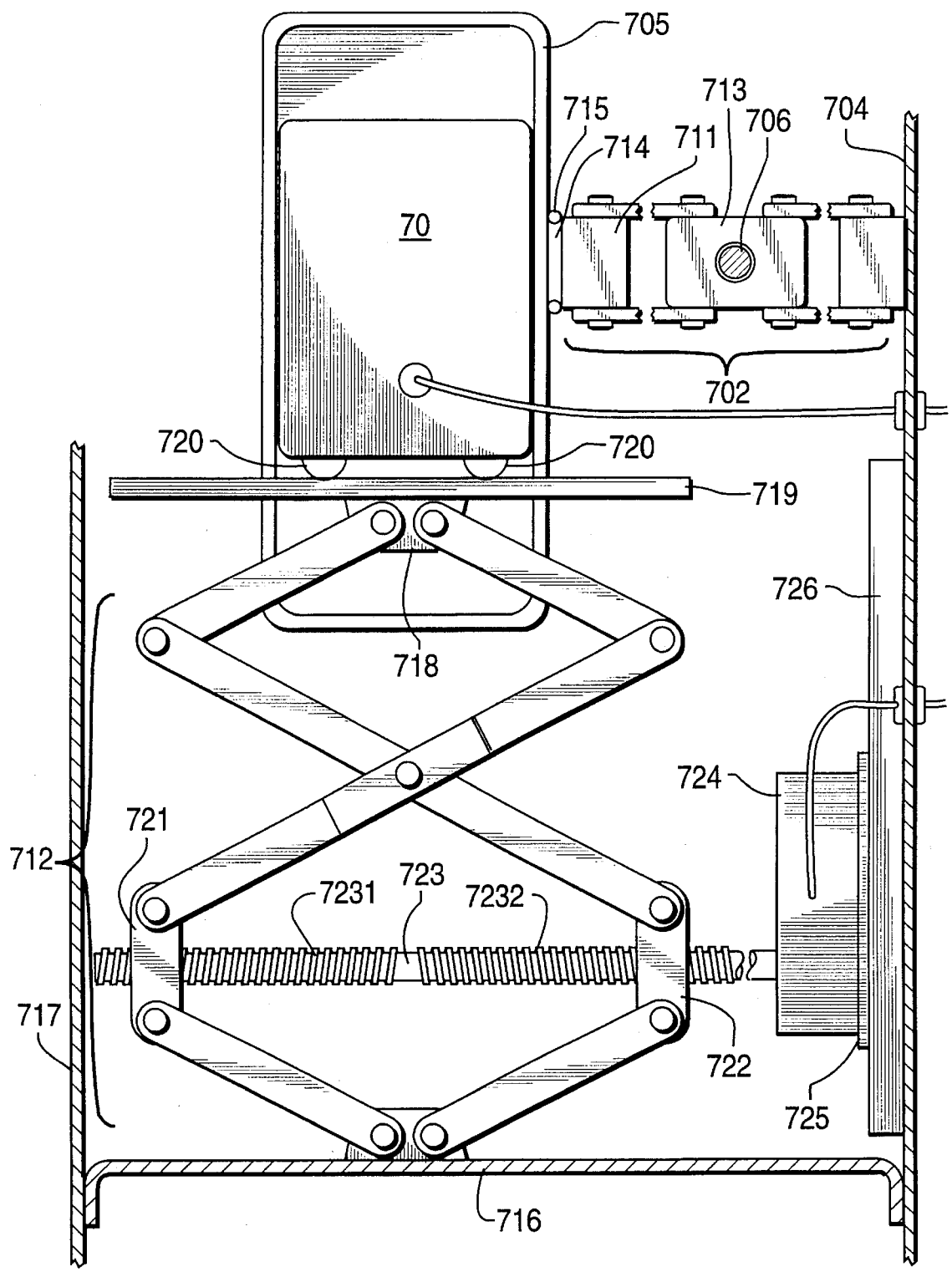
FIG. 22 is a sectional side view of magnetic recording/reproducing apparatus constructed to have the video camera associated therewith tilted up or down.

FIG. 22 is a sectional side view of magnetic recording/ reproducing apparatus revealing the tilt mechanism for the video camera 70, parts of which are a scissors jack that uses a double-window scissor frame 712. The scissors jack portion of the tilt mechanism uses a double-window scissor frame 712, to get more lifting capability in a smaller amount of room in front of the back panel 710.

The swivel mechanism uses the single-window scissors frame 702, on the other hand, so the width of the swivel mechanism when collapsed could be minimized, thus to lessen the constraint on swiveling. Where the video camera 70 is mounted centrally on the front panel so as to permit a wider angle of camera swivel without the problem of banging into the lateral side panel of the main body 700 a plural-window scissor frame can also be used in the swivel mechanism. The single-window scissors frame 702 is shown in end view in FIG. 22 with the swivel motor 707, the shoe 708 and the horizontal trackway 709 cut away to show in sectional view the lead screw 706 on the motorshaft of the swivel motor 707. The rear captive nut 713 through which the lead screw 706 threads is shown in FIG. 22, in which figure this rear captive nut 713 hides the front captive nut through which the lead screw 706 threads. The pivot assembly 711 is shown hinged to the yoke 705 by a hinge 714 having a vertical hinge pin 715 that functions as a wrist pin, permitting twisting of the yoke 705 respective to the pivot assembly 711 as the video camera 70 swivels in response to the scissors frame 702 either extending or collapsing.

A lowermost pivot assembly 716 of the scissors frame 712, is mounted on a shelf 716 within the main body 700 that extends between the interior partition wall 704 and the right lateral side wall 717 of the main body 700 (appearing at the left of the FIG. 22 rear view and is attached to these walls by means such as welds. An uppermost pivot assembly 718 of the scissors frame 712 supports a semicircular track 719 attached thereto along which runs at least one caster 720 on the bottom of the video camera 70, near its back. In the interest of quietness of the swiveling mechanism, each such caster is formed from a medium-hardness rubber. FIG. 22 shows two such casters 720 supporting the back of the video camera 70 as it swivels on the semicircular track 719.

As viewed from the rear of the magnetic recording/reproducing apparatus per FIG. 22 one of the left corners of the scissors frame 712 and the opposed one of its right corners contain respective captive nuts 721 and 722 with a left-hand interior threading and with a right-hand interior threading, respectively, for receiving a lead screw 723 having left-hand exterior threading on its left portion 724 and having right-hand exterior threading on its right portion 725. The lead screw 723, which by its rotation extends and collapses the scissors frame 712, is on the motorshaft of a tilt motor 724 mounted on a shoe 725 that slides in a vertical trackway 726 mounted on the interior partition wall 704 of the main body 700. FIG. 22 shows the tilt motor 724 as one having an motorshaft offset towards one end of the motor, but design modifications can be made to accommodate motors with a centered motorshaft, of course. As the uppermost pivot assembly 718 of the scissors frame 712 is raised in response to rotation of the motorshaft of the tilt motor 724 in a first sense, the back of the video camera 70 is lifted up; and the lens 72 of the video camera 70 shown in FIG. 21 as being mounted in gimbals 701 is pointed with reduced elevation angle. Conversely, as the uppermost pivot assembly 718 of the scissors frame 712 is lowered in response to rotation of the motorshaft of the tilt motor 724 in a second sense opposite to the first sense of motorshaft rotation, the back of the video camera 70 drops by force of gravity; and the lens 72 of the video camera 70 shown in FIG. 21 as being mounted in gimbals 701 is pointed with increased elevation angle.

Figure 23:
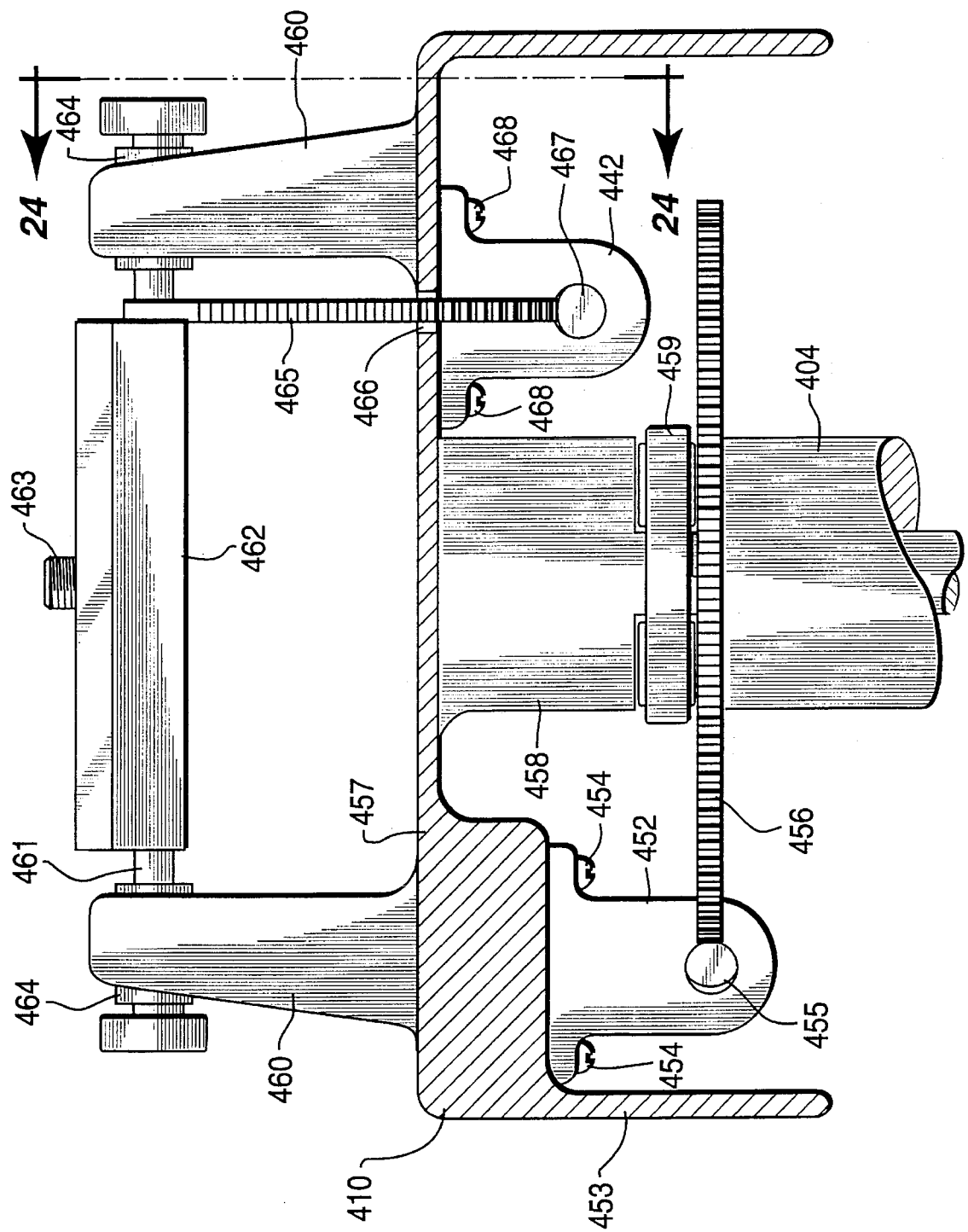
FIG. 23 is a sectional partial side view of a wireless satellite video camera such as that of FIG. 13, illustrating how the electrically controllable swivel and tilt mechanisms can be implemented.

FIG. 23 is a sectional side view of a wireless satellite video camera such as that shown in FIG. 13 illustrating how the electrically controllable swivel and tilt mechanisms can be implemented. The tripod 400 is assumed to be of the same type as shown in FIG. 13 having three support legs 401, 402 and 403 and having its main body 410 rotatable on the central axis column 404 respective to those support legs. The swivel motor 452 is located near the interior surface of a sidewall 453 of the main body 410 being secured to the interior surface of the top 457 of the main body 410 by machine screws 454 fitted from below into clearance holes in feet of the motor 452 and screwed into tight-fit threaded holes in the top 457. The top of the central axis column 404 has a worm wheel 456 mounted thereon in fixed position. The worm wheel 456 has gear teeth around its perimeter which are engaged by a worm gear 455 on the motorshaft of the swivel motor 452. The interior surface of the top 457 of the main body 410 has a stepped shaft 458 extending down from its center, which is fitted through a roller bearing 459 and into a central hole in the central axis column 404, with the shoulder of the stepped shaft 458 being supported by the roller bearing 459 resting on the top surface of the worm wheel 456. The bottom of the stepped shaft 458, not shown in FIG. 23, is secured within the central hole in the central axis column 404 by a cap that allows the central axis column 404 and the three support legs 401, 402 and 403 to be lifted together with the main body 410. The main body 410 is left free, however, to be rotated respective to the worm wheel 456, the central axis column 404, and the three support legs 401,402 and 403 when driven by the turning of the worm gear 455 on the motorshaft of the swivel motor 452. The pitch of the worm gear 455 is such that it cannot be turned by the worm wheel 456, which locks the main body 410 in the swivel position it has when the motorshaft of the swivel motor 452 stops rotating.

The exterior surface of the top 457 of the main body 410 has bearing mounts 460 thereon for receiving the opposed axles 461 of a tilt plate 462 shown in horizontal position. The tilt plate 462 has a threaded stud 463 in the center of its top surface for entering a threaded hole in the bottom of the video camera 330 when it is screwed onto the threaded stud 463 during mounting on the tilt plate 462. The bearing mounts 460 can hold sleeve bearings 464, for example, and are of such height above the exterior surface of the top 457 of the main body 410 that the tilt plate 462 can move the video camera 330 through the desired tilt range without the edge of the top 457 of the main body 410 coming into the camera 330 field of view or the camera 330 case banging into that top 457. The diametric edge of a semicircular sector 465 of a worm gear wheel is joined at right angles to the tilt plate 462 and extends through a slot 466 in the top 457 of the main body 410 to mesh with a worm gear 467 on the motorshaft of the tilt motor 442. The tilt motor 442 is secured to the interior surface of the top 457 of the main body 410 by machine screws 468 fitted from below into clearance holes in feet of the motor 442 and screwed into tight-fit threaded holes in the top 457. The diametric edge of the semicircular sector 465 of a worm gear wheel is joined at right angles to the tilt plate 462, so it rotates with the tilt plate 462 around the opposed axles 461, and so the slot 466 is offset from the stepped shaft 458. The pitch of the worm gear 467 is such that it cannot be turned by the semicircular sector 465 of a worm gear wheel, which locks the tilt plate 462 in the tilt position it has when the motorshaft of the tilt motor 442 stops rotating.

In alternative arrangements which use a crank and lever assembly to adjust the tilt angle of the tilt plate 462, the crank is preferably rotated using a worm gear drive, to provide for locking the tilt plate 462 in the tilt position it has when the motorshaft of the tilt motor 442 stops rotating. Also, in alternative arrangements which use a cam plate to adjust the tilt angle of the tilt plate 462, the cam plate is preferably rotated using a worm gear drive, to provide for locking the tilt plate 462 in the tilt position it has when the motorshaft of the tilt motor 442 stops rotating.

Figure 24:
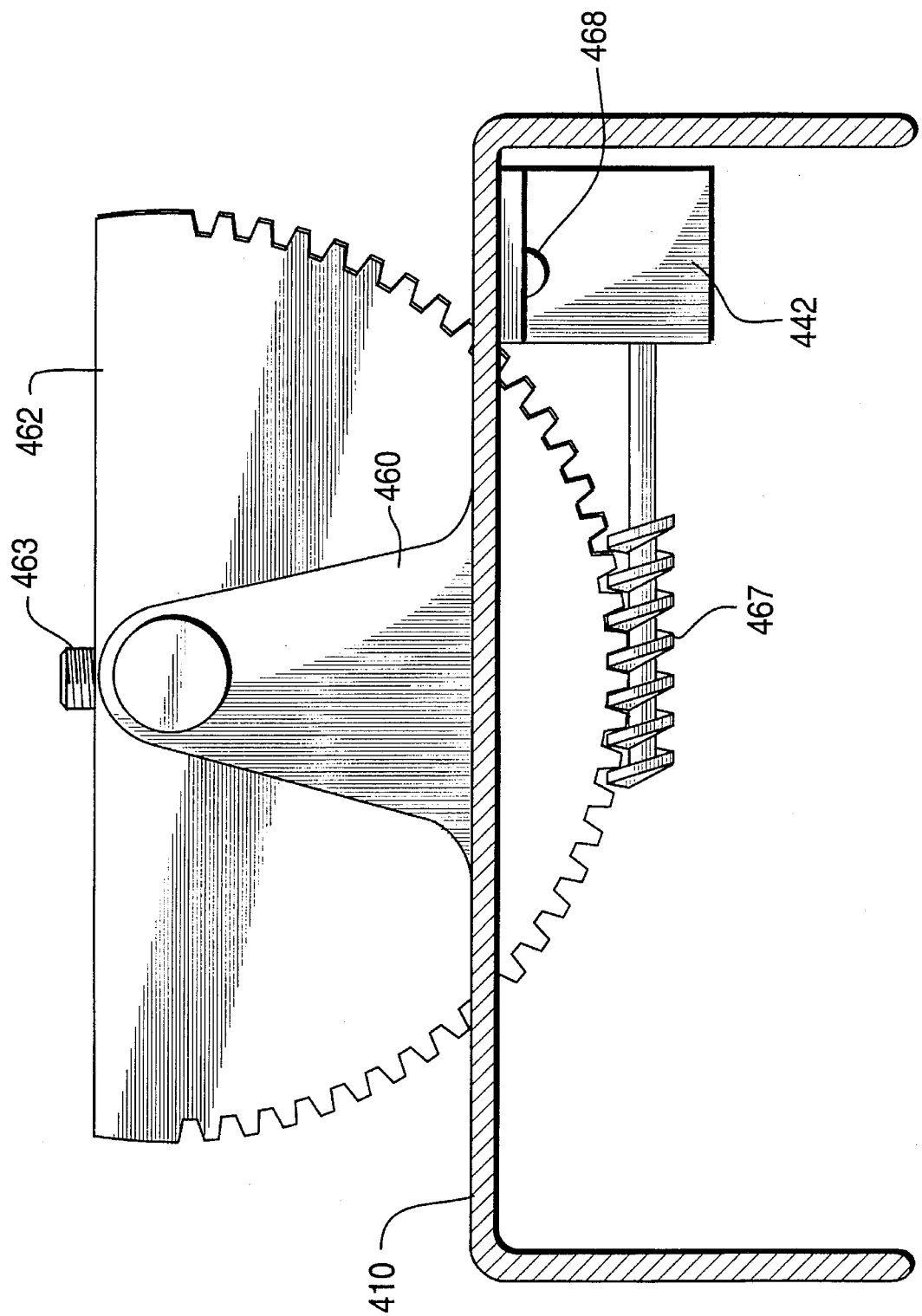
FIG. 24 is a sectional partial side view of the main body of the FIG. 23 wireless satellite video camera, the viewing angles of FIGS. 23 and 24 being at right angles to each other.

FIG. 24 is another sectional side view of the main body 410 of the wireless satellite video camera shown in FIG. 23, the viewing angles of FIGS. 23 and 24 being at right angles to each other.

Rather than the swivel and tilt mechanisms for the video camera each using a motor that slews at substantially constant rate together with an angle resolver in a feedback servomechanism, one or each of the swivel and tilt mechanisms can use a stepping motor with a change in its rotation angle and its driving signal being measured by numbers of stepping positions.

By acquaintance with the foregoing disclosure one skilled in the art will be enabled to design other embodiments of the various aspects of the invention, and this should be borne in mind when construing the scopes of the claims which follow. In the claims which follow, the term "composite video signal" shall be construed to include signals that include both video components and accompanying audio components, as well as signals that include video components but do not include accompanying audio components. The term "composite video signal" shall be construed to include signals where the video signals appear as separate luminance and chrominance signals, where the video signals appear as separate luminance and color-difference signals, or where the video signals appear as separate primary color signals. The term "radio receiver" shall specifically include within its scope the broadcast signal receivers 11 of FIGS. 2, 4, 16 and 19.

What is claimed is:

1. A wireless video camera drive apparatus for a wireless video camera used in a system including a magnetic recording/reproducing apparatus with a radio receiver for receiving broadcast television signals and television signals from said wireless video camera, said wireless video camera drive apparatus comprising:

a set of tripod legs;

a tripod main body rotatably mounted on said set of tripod legs;

a plate connected to said tripod main body so as to permit adjustment of the tilt of said plate, to which plate said wireless video camera is at least at times affixed;

a first drive motor arranged for rotating the tripod main body with respect to said set of tripod legs in response to a first drive control signal;

sound source sensing apparatus for sensing the direction of a sound source and supplying an output signal indicative of said direction;

a camera rotation signal receiver for receiving key input signals from a remote controller and supplying a respective output signal indicative of a desired camera angle responsive to each key input signal; and a microcomputer responding to said output signals from the camera rotation signal receiver and from the sound source sensing apparatus to generate said first drive control signal.

2. A wireless video camera drive apparatus as set forth in claim 1 further comprising:

a second drive motor arranged for adjusting the tilt of said plate respective to said main body in response to a second drive control signal generated by said microcomputer responding to said output signals from the camera rotation signal receiver.

* * * * *